United States Patent
Hosseini et al.

(10) Patent No.: US 11,005,549 B2
(45) Date of Patent: May 11, 2021

(54) DEDICATED CHANNEL STATE INFORMATION REPORTING FOR A CONTROL CHANNEL

(71) Applicant: QUALCOMM Incorporated, San Diego, CA (US)

(72) Inventors: Seyedkianoush Hosseini, San Diego, CA (US); Wanshi Chen, San Diego, CA (US); Kambiz Azarian Yazdi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/044,495

(22) Filed: Jul. 24, 2018

(65) Prior Publication Data

US 2019/0036585 A1     Jan. 31, 2019

Related U.S. Application Data

(60) Provisional application No. 62/537,401, filed on Jul. 26, 2017.

(51) Int. Cl.
*H04B 7/06* (2006.01)
*H04L 1/00* (2006.01)
(Continued)

(52) U.S. Cl.
CPC ........... *H04B 7/0639* (2013.01); *H04L 1/001* (2013.01); *H04L 1/0004* (2013.01);
(Continued)

(58) Field of Classification Search
CPC ..... H04B 7/0639; H04L 1/0025; H04L 1/001; H04L 1/0004; H04L 5/0057;
(Continued)

(56) References Cited

U.S. PATENT DOCUMENTS

| 2012/0327882 A1* | 12/2012 | Park | H04B 7/0632 370/329 |
| 2015/0156000 A1* | 6/2015 | Ko | H04L 5/0057 370/329 |

(Continued)

FOREIGN PATENT DOCUMENTS

| EP | 3125456 A1 | 2/2017 |
| WO | WO-2016072712 A2 | 5/2016 |

OTHER PUBLICATIONS

International Search Report and Written Opinion—PCT/US2018/043686—ISA/EPO—dated Oct. 9, 2018.

*Primary Examiner* — Shailendra Kumar
(74) *Attorney, Agent, or Firm* — Holland & Hart LLP

(57) ABSTRACT

Methods, systems, and devices for wireless communication are described. A method may include measuring channel quality of a reference signal communicated via a control channel, determining a code rate for a control channel based on the measured reference signal, generating feedback data for the control channel based on the code rate, and transmitting the feedback data. Another method may include transmitting a reference signal in a control channel, receiving channel quality feedback data for the control channel in response to the reference signal, and transmitting a control channel transmission in the control channel using a modulation and coding scheme selected based on the feedback data.

62 Claims, 20 Drawing Sheets

(51) Int. Cl.
*H04L 1/18* (2006.01)
*H04L 5/00* (2006.01)
*H04W 24/10* (2009.01)
*H04W 72/04* (2009.01)
*H04L 1/16* (2006.01)

(52) U.S. Cl.
CPC .......... *H04L 1/0025* (2013.01); *H04L 1/1861* (2013.01); *H04L 5/0055* (2013.01); *H04L 5/0057* (2013.01); *H04W 24/10* (2013.01); *H04W 72/042* (2013.01); *H04L 1/0027* (2013.01); *H04L 1/1671* (2013.01); *H04L 1/1812* (2013.01)

(58) Field of Classification Search
CPC ... H04L 5/0055; H04L 1/1861; H04L 1/0027; H04L 1/1671; H04L 1/1812; H04W 72/042; H04W 24/10
See application file for complete search history.

(56) References Cited

U.S. PATENT DOCUMENTS

| | | | |
|---|---|---|---|
| 2017/0180099 A1* | 6/2017 | Kim | H04L 5/0055 |
| 2017/0338877 A1* | 11/2017 | Yum | H04B 17/318 |
| 2018/0098235 A1* | 4/2018 | Bagheri | H04L 5/0048 |
| 2018/0139774 A1* | 5/2018 | Ma | H04W 72/14 |
| 2018/0324007 A1* | 11/2018 | Nammi | H04B 7/0626 |
| 2019/0098640 A1* | 3/2019 | Holakouei | H04L 1/1835 |
| 2019/0387501 A1* | 12/2019 | Park | H04L 5/005 |

* cited by examiner

DEDICATED CHANNEL STATE INFORMATION REPORTING FOR A CONTROL CHANNEL

CROSS REFERENCES

The present Application for Patent claims the benefit of U.S. Provisional Patent Application No. 62/537,401 by Hosseini et al., entitled "DEDICATED CHANNEL STATE INFORMATION REPORTING FOR A CONTROL CHANNEL," filed Jul. 26, 2017, assigned to the assignee hereof, and expressly incorporated herein.

BACKGROUND

The following relates generally to wireless communication, and more specifically to dedicated channel state information reporting for a control channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station may transmit information to a UE to allocate resources for transmission. A portion of the resources (i.e., time and frequency resources) may be designated for transmission of this information. The base station may also use different communication channels to provide the information to the UE. For example, the base station may use a control channel to transmit control information to the UE, and a data channel to transmit data to the UE. In some scenarios, the information may relate to ultra-reliable low latency communications (URLLC) with mission critical (MiCr) applications. These applications generally specify a low error rate and low latency. In cases where transmission of information between the base station and the UE is unsuccessful due to conditions of a communication channel, the base station may retransmit the information one or more times. In some scenarios, the base station may be unable to meet error rate and latency specifications due to the base station retransmitting information one or more times. Improving the efficiency of retransmission may provide reliability to a wireless communication system.

SUMMARY

The described techniques relate to improved methods, systems, devices, or apparatuses that support dedicated channel state information reporting for a control channel. According to the principles of this disclosure, a UE communicating with a base station in a wireless communication system may support dedicated channel state information reporting for a control channel. Techniques of the present disclosure may improve reliability and efficiency in a wireless communication system by providing feedback reporting for the control channel.

A UE may determine to generate channel quality feedback data (e.g., for a subband or multiple subbands) based on identifying that decoding of information (e.g., from that subband) was unsuccessful. For example, if a first transmission fails (e.g., the UE is able to decode control channel transmission in a subband but fails to decode a data channel within that subband), the importance of the UE to successfully decode a retransmission of a control channel transmission and a data channel transmission may increase, for example, to meet a latency specification. In such a case, the UE may provide channel quality feedback data (e.g., that is specific to a particular subband) for retransmission of the control channel transmission. In some cases, the UE may provide the channel quality feedback data in a hybrid automatic repeat request (HARQ) negative acknowledgment (NACK).

The HARQ NACK may be associated with a prior data channel transmission scheduled by the prior control channel transmission. By limiting the channel quality feedback data reporting (e.g., to reporting only on a particular subband), the processing burden on the UE may be reduced enabling the UE to more quickly transmit channel quality feedback data to the base station. Moreover, a base station is more likely able to process the feedback data and adjust a code rate and/or aggregation level in an effort to achieve the latency specification. For example, a base station may process the feedback data to select a code rate and/or aggregation level (e.g., for the subband) based on whether control information is being sent a first time or retransmitted. For an initial transmission, the base station may select a code rate and/or aggregation level to achieve a lower reliability as compared to a code rate and/or aggregation level selected for a retransmission (e.g., via the subband).

A method of wireless communication at a UE is described. The method may include measuring channel quality of a reference signal communicated via a control channel, determining a code rate for the control channel based on the measured reference signal, generating feedback data for the control channel based on the code rate, and transmitting the feedback data.

An apparatus for wireless communication at a UE is described. The apparatus may include a processor, memory in electronic communication with the processor, and instructions stored in the memory. The instructions may be executable by the processor to cause the apparatus to measure channel quality of a reference signal communicated via a control channel, determine a code rate for the control channel based on the measured reference signal, generate feedback data for the control channel based on the code rate, and transmit the feedback data.

Another apparatus for wireless communication at a UE is described. The apparatus may include means for measuring channel quality of a reference signal communicated via a control channel, determining a code rate for the control channel based on the measured reference signal, generating feedback data for the control channel based on the code rate, and transmitting the feedback data.

A non-transitory computer-readable medium storing code for wireless communication at a UE is described. The code may include instructions executable by a processor to measure channel quality of a reference signal communicated via a control channel, determine a code rate for the control channel based on the measured reference signal, generate feedback data for the control channel based on the code rate, and transmit the feedback data.

Some examples of the method, apparatuses, and non-transitory computer-readable medium described herein may further include operations, features, means, or instructions for determining at least one of a channel quality indicator (CQI), a pre-coding matrix indicator (PMI), a precoding type indicator (PTI), or a rank indicator (RI), or a combination thereof, and where the feedback data for the control channel includes at least one of the CQI, the PMI, the PTI, or the RI, or a combination thereof.

Some examples of the method, apparatuses, and non-transitory computer-readable medium described herein may further include operations, features, means, or instructions for identifying a payload size of a control information transmission and a metric of the control channel and determining a reliability parameter for the control channel, where determining the code rate for the control channel may be based on the identified payload size, the metric of the control channel, and the determined reliability parameter.

Some examples of the method, apparatuses, and non-transitory computer-readable medium described herein may further include operations, features, means, or instructions for selecting a modulation scheme associated with the control information transmission, where determining the code rate for the control channel may be based on the modulation scheme.

Some examples of the method, apparatuses, and non-transitory computer-readable medium described herein may further include operations, features, means, or instructions for identifying an index from a set of indexes in a code rate index table for the control information transmission corresponding to the determined code rate, where the feedback data includes the identified index.

Some examples of the method, apparatuses, and non-transitory computer-readable medium described herein may further include operations, features, means, or instructions for determining an aggregation level (AL) based on the identified payload size, the determined code rate, and the determined reliability parameter, and where generating the feedback data may be based on the determined AL.

In some examples of the method, apparatuses, and non-transitory computer-readable medium described herein, the feedback data includes at least one bit to indicate the determined AL.

Some examples of the method, apparatuses, and non-transitory computer-readable medium described herein may further include operations, features, means, or instructions for determining the code rate for the control channel may be based on a modulation scheme.

In some examples of the method, apparatuses, and non-transitory computer-readable medium described herein, the modulation scheme includes at least one of quadrature phase shift keying (QPSK) or quadrature amplitude modulation (QAM).

Some examples of the method, apparatuses, and non-transitory computer-readable medium described herein may further include operations, features, means, or instructions for determining the code rate for the control channel may be based on a number of layers and a transmission mode for control information transmission.

In some examples of the method, apparatuses, and non-transitory computer-readable medium described herein, the transmission mode may be one of a common reference signal (CRS)-based transmission mode or a demodulation reference signal (DMRS)-based transmission mode.

In some examples of the method, apparatuses, and non-transitory computer-readable medium described herein, a periodicity for transmitting the reference signal may be based on a duration of a mini-slot or a shortened transmission time interval (sTTI).

Some examples of the method, apparatuses, and non-transitory computer-readable medium described herein may further include operations, features, means, or instructions for determining a payload size for each of a set of DCI formats and determining a set of code rates for the control channel based on the determined payload sizes.

In some examples of the method, apparatuses, and non-transitory computer-readable medium described herein, the feedback data includes a mapping of each of the determined code rates to a respective payload size of a set of different payload sizes.

Some examples of the method, apparatuses, and non-transitory computer-readable medium described herein may further include operations, features, means, or instructions for determining a set of aggregation levels based on the set of code rates, where each of the set of aggregation levels corresponds to a payload size of a set of different payload sizes.

In some examples of the method, apparatuses, and non-transitory computer-readable medium described herein, the feedback data includes a mapping of each of the determined aggregation levels to a respective payload size of the set of different payload sizes.

Some examples of the method, apparatuses, and non-transitory computer-readable medium described herein may further include operations, features, means, or instructions for receiving, from a base station, configuration information instructing the UE to perform a measurement on a number of subbands associated with one or more component carriers.

Some examples of the method, apparatuses, and non-transitory computer-readable medium described herein may further include operations, features, means, or instructions for selecting to measure on one or more subbands of the number of subbands based on a UE configuration.

In some examples of the method, apparatuses, and non-transitory computer-readable medium described herein, the feedback data includes channel state information for a subband of the control channel, channel state information for a set of subbands that includes the subband, or wideband channel state information.

Some examples of the method, apparatuses, and non-transitory computer-readable medium described herein may further include operations, features, means, or instructions for determining to generate the feedback data for the control channel based on identifying that decoding of information from a second subband was successful.

In some examples of the method, apparatuses, and non-transitory computer-readable medium described herein, a reporting timeline associated with transmitting the feedback data may be based on whether decoding of information from a second subband was successful.

Some examples of the method, apparatuses, and non-transitory computer-readable medium described herein may further include operations, features, means, or instructions for determining the code rate for the control channel may be based on a transmission index.

Some examples of the method, apparatuses, and non-transitory computer-readable medium described herein may further include operations, features, means, or instructions for determining to generate the feedback data for the control channel based on identifying that decoding of information from the control channel was unsuccessful.

In some examples of the method, apparatuses, and non-transitory computer-readable medium described herein, a reporting timeline associated with transmitting the feedback data may be based on a number of subband measurements, or a measurement type, or a number of payload sizes for control information, or any combination thereof.

Some examples of the method, apparatuses, and non-transitory computer-readable medium described herein may further include operations, features, means, or instructions for receiving an indicator of a reporting timeline associated with transmitting the feedback data, where the reporting timeline may be based on a number of possible re-transmissions within a latency window.

In some examples of the method, apparatuses, and non-transitory computer-readable medium described herein, the control channel may be a shortened physical downlink control channel (sPDCCH).

Some examples of the method, apparatuses, and non-transitory computer-readable medium described herein may further include operations, features, means, or instructions for receiving, from a base station, a feedback trigger instructing the UE to separately or jointly provide the feedback data.

In some examples of the method, apparatuses, and non-transitory computer-readable medium described herein, the feedback trigger includes at least one bit.

In some examples of the method, apparatuses, and non-transitory computer-readable medium described herein, transmitting the feedback data further may include operations, features, means, or instructions for transmitting the feedback data for the control channel separately or jointly with reporting second feedback data for a data channel.

In some examples of the method, apparatuses, and non-transitory computer-readable medium described herein, the feedback data for the control channel may be reported jointly with reporting of second feedback data for the data channel based on reporting of the feedback data for the control channel colliding with reporting of the second feedback data for the data channel.

In some examples of the method, apparatuses, and non-transitory computer-readable medium described herein, the feedback data for the control channel may be reported separately from reporting of second feedback data for the data channel based on reporting of the feedback data for the control channel not colliding with reporting of the second feedback data for the data channel.

Some examples of the method, apparatuses, and non-transitory computer-readable medium described herein may further include operations, features, means, or instructions for receiving a configuration signaling indicating whether to separately or jointly report the feedback data for the control channel and second feedback data for the data channel.

A method of wireless communication at a base station including is described. The method may include transmitting a reference signal in a control channel, receiving channel quality feedback data for the control channel in response to the reference signal, and transmitting a control channel transmission using a modulation and coding scheme selected based on the feedback data.

An apparatus for wireless communication at a base station including is described. The apparatus may include a processor, memory in electronic communication with the processor, and instructions stored in the memory. The instructions may be executable by the processor to cause the apparatus to transmit a reference signal in a control channel, receive channel quality feedback data for the control channel in response to the reference signal, and transmit a control channel transmission using a modulation and coding scheme selected based on the feedback data.

Another apparatus for wireless communication at a base station including is described. The apparatus may include means for transmitting a reference signal in a control channel, receiving channel quality feedback data for the control channel in response to the reference signal, and transmitting a control channel transmission using a modulation and coding scheme selected based on the feedback data.

A non-transitory computer-readable medium storing code for wireless communication at a base station including is described. The code may include instructions executable by a processor to transmit a reference signal in a control channel, receive channel quality feedback data for the control channel in response to the reference signal, and transmit a control channel transmission using a modulation and coding scheme selected based on the feedback data.

Some examples of the method, apparatuses, and non-transitory computer-readable medium described herein may further include operations, features, means, or instructions for determining a code rate index from a set of indexes in a code rate index table based on the feedback data and encoding control information based on a code rate corresponding to the code rate index, where the control channel transmission may be generated based on the encoded control information.

Some examples of the method, apparatuses, and non-transitory computer-readable medium described herein may further include operations, features, means, or instructions for determining an aggregation level from a set of aggregation levels based on the feedback data and encoding control information based on the determined aggregation level, where the control channel transmission may be generated based on the encoded control information.

Some examples of the method, apparatuses, and non-transitory computer-readable medium described herein may further include operations, features, means, or instructions for determining that the feedback data includes a negative acknowledgment for data transmitted via the control channel, the data encoding using a first code rate, encoding the data using a second code rate that differs from the first code rate and transmitting the data encoded using the second code rate via the control channel.

Some examples of the method, apparatuses, and non-transitory computer-readable medium described herein may further include operations, features, means, or instructions for selecting a format for control information, determining a payload size of the selected format, selecting a code rate for the control information based on the determined payload size and the feedback data and encoding the control information based on the selected code rate, where the control channel transmission may be generated based on the encoded control information.

Some examples of the method, apparatuses, and non-transitory computer-readable medium described herein may further include operations, features, means, or instructions for determining a number of possible re-transmissions within a latency window based on the determined payload size, the selected code rate, or both and transmitting an indicator of a reporting timeline associated with transmitting the feedback data based on the determined number of possible re-transmissions.

In some examples of the method, apparatuses, and non-transitory computer-readable medium described herein, the feedback data includes channel state information for a subband of the control channel, channel state information for a set of subbands that includes the subband, or wideband channel state information.

DETAILED DESCRIPTION

Figure 1:
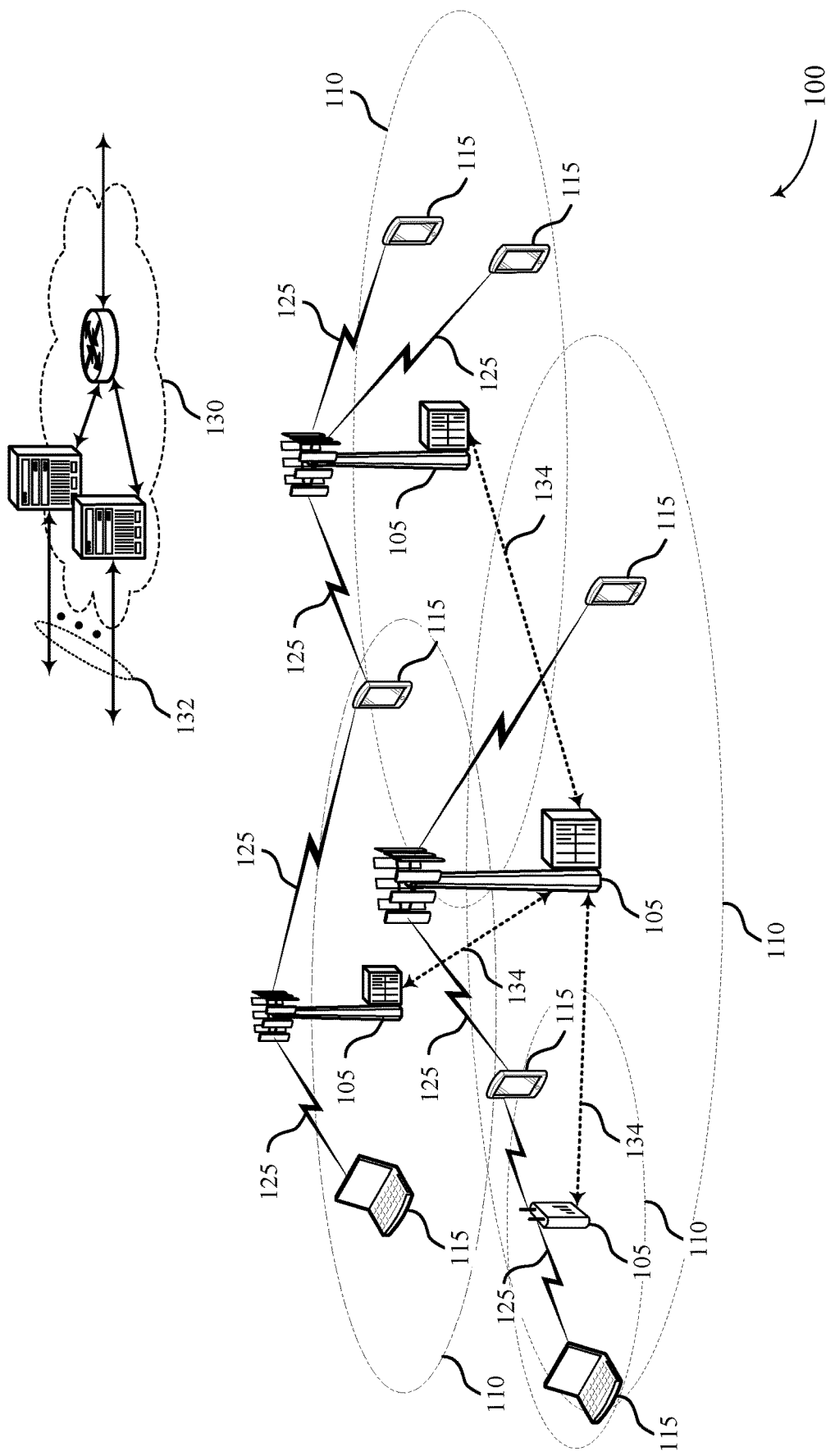
FIG. 1 illustrates an example of a system for wireless communication that supports dedicated channel state information reporting for a control channel, in accordance with aspects of the present disclosure.

According to the principles of this disclosure, a UE communicating with a base station in a wireless communication system may support dedicated channel state information reporting for a control channel. A base station may establish a connection with a UE and allocate resources for transmission to the UE, during a radio resource management (RRM) procedure. For example, the base station may assign a portion of resources (e.g., subframes and subbands) designated for transmission of information to the UE. In some scenarios, transmission of the information may specify a certain error rate and latency. For example, a URLLC application may specify an error rate of no more than $10^{-5}$ and a latency of no more than 1 millisecond (ms). To achieve such a low error rate, a base station may transmit a same packet multiple times within 1 ms.

Existing solutions provide feedback reporting for a data channel. Providing feedback reporting for a data channel may be an effective tool for improving reliability of a wireless communication system; in scenarios where information exchanged between the UE and the base station specifies a low error rate and low latency. However, in some wireless communications systems, merely providing feedback for the data channel may be insufficient.

In accordance with the examples described herein, a base station may coordinate with a UE to provide channel quality feedback reporting for a control channel. In some examples, a base station may coordinate with a UE to vary the level of coding protection applied to data being transmitted to provide a balance between the efficiency-latency tradeoff of a wireless communication. For example, data may be encoded with less protection for a first transmission to achieve a lower reliability parameter (e.g., block error rate). If the UE indicates that the first transmission was not successfully decoded, the base station may encode the data with greater protection in a retransmission to increase the likelihood that the data is received, e.g., within 1 ms. Thus, to achieve the error rate and latency specifications of low latency applications, a code rate and/or aggregation level may be adjusted based on whether data is being sent a first time or a subsequent time. Therefore, techniques of the present disclosure describe improving reliability, latency, and efficiency in a wireless communication system by providing channel quality feedback reporting for a control channel.

Aspects of the disclosure are initially described in the context of a wireless communications system. Exemplary UEs and base stations (e.g., evolved NodeBs (eNBs), next generation NodeBs (gNBs)), systems, and process flow that support dedicated channel state information reporting for a control channel are then described. Aspects of the disclosure are further illustrated by and described with reference to apparatus diagrams, system diagrams, and flowcharts that relate to dedicated channel state information reporting for a control channel.

FIG. 1 illustrates an example of a system 100 for wireless communication that supports dedicated channel state information reporting for a control channel, in accordance with aspects of the present disclosure. The system 100 includes base stations 105, UEs 115, and a core network 130. In some examples, the system 100 may be an LTE, LTE-Advanced (LTE-A) network, or a NR network. In some cases, system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information may be transmitted by base station 105 to UE 115 during a transmission time interval (TTI) of a downlink channel. Additionally, the control information may be distributed between different control regions in a cascaded manner (e.g., between a common control region and one or more UE-specific control regions).

UEs 115 may be dispersed throughout the system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115 or may operate under the control of a base station controller (not shown). In some examples, base stations 105 may be macro cells, small cells, hot spots, or the like. Base stations 105 may also be referred to as evolved NodeBs (eNBs) 105.

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within a geographic coverage area 110. In various examples, the base station 105 may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

System 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, system 100 may utilize enhanced component carriers (eCCs). An eCC may be characterized by one or more features including: wider bandwidth, shorter symbol duration, and shorter transmission time interval (sTTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, system 100 may utilize both licensed and unlicensed radio frequency spectrum bands. For example, system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as the base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on FDD, TDD, or a combination of both.

Time intervals in LTE or NR may be expressed in multiples of a basic time unit (which may be a sampling period of $T_s=1/30,720,000$ seconds). Time resources may be organized according to radio frames of length of 10 ms ($T_f$=307200$T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Base station 105 may transmit a reference signal or a control signal to a UE 115 via a physical layer. In some examples, base station 105 may transmit control information and data to UE 115. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information may be transmitted during a sTTI or a TTI of a downlink channel. In some examples, periodicity of reference signal transmission may be based on a duration of a mini-slot or sTTI.

To enhance a reliability of a control channel a dedicated feedback process for the control channel may be implemented. Base station 105 may transmit a reference signal to a UE 115 in one or more subbands of a control channel. In some examples, the reference signal may be a wideband transmission, and the UE 115 may calculate channel state information (CSI) for one or more subbands, and/or for the entire bandwidth of the control channel, by measuring the reference signal. The control channel may be a shortened Physical Downlink Control Channel (sPDCCH) that includes scheduling, power control, and ACK/NACK information. In some examples, the control channel may have a bandwidth that is divided into multiple subbands. In some cases, base station 105 may transmit control information within one or more subbands to UE 115 using a modulation scheme.

For example, base station 105 may transmit control information using quadrature phase shift keying (QPSK). In some cases, higher order modulation schemes such as quadrature amplitude modulation (QAM) (e.g., 16QAM) may also be used by base station 105 for transmitting the control information. Additionally, base station 105 may transmit the control information using QPSK or QAM and space frequency block coding (SFBC). In some cases, the modulation scheme used by base station 105 may be static or dynamic. In some cases, to enhance the reliability of a control channel a dedicated feedback process for the control channel may be configured based on a number of layers and a transmission mode for control information transmission. For instance, the dedicated feedback process for the control channel may be configured with a logical antenna configuration. The logical antenna configuration may be a single-port CSI reference signal (RS) configuration. For example, when SFBC is used, the transmission mode may be a single-layer. In this case, one-port CSI-RS may satisfy for UE 115 to perform a channel measurement.

UE 115 may receive the transmitted reference signal from the base station 105. For example, a UE may receive a reference signal within one or more subbands of the control channel. Upon receiving the reference signal, the UE 115 may measure the reference signal (e.g., determine a signal to noise plus interference (SINR) ratio) and determine a code rate for one or more subbands, or the entire bandwidth of the control channel, based on the measurement of the reference signal. The code rate may refer to the amount of information bits transmitted within a transport block relative to a maximum number of bits that could be transmitted in the transport block. A higher code rate corresponds to a greater number of information bits being transmitted, at the expense of offering less protection against corruption caused by the wireless channel. A lower code rate corresponds to a lower number of information bits being transmitted and permits use of coding techniques that provide more protection against corruption caused by the wireless channel. In some cases, UE 115 may attempt to meet a block error rate to enhance or sustain a reliability of a control channel. As such, UE 115 monitors the reference signal transmitted from base station 105 to determine the SINR and selects a code rate based on the SINR to satisfy the block error rate. The UE 115 may generate channel quality feedback data for one or more subbands, or the entirety of the bandwidth of the control channel, based on the determined code rate, and transmit the channel quality feedback data to the base station 105. In some examples, the channel quality feedback data may include the selected code rate, an aggregation level, or both, for the base station 105 to use for transmissions within the one or more subbands.

In some examples, the aggregation level may indicate an amount of control channel elements (CCEs) used for transporting a control channel (e.g., sPDCCH). Aggregation level one (AL1) may correspond to a single CCE, AL2 may correspond to 2 CCEs, AL4 may correspond to 4 CCEs, and so forth.

In some cases, the UE 115 may provide channel quality feedback data per-subband for an interval having multiple subbands. Each subband may be associated with a control channel and a data channel. Additionally, the UE 115 may calculate one or more parameters using the measurement of the reference signal. For example, the UE may determine at least one of a channel quality indicator (CQI), a pre-coding matrix indicator (PMI), a precoding type indicator (PTI), or a rank indicator (RI). The channel quality feedback data may include a CSI for a control channel (e.g., sPDCCH). In some examples, the feedback data may also include the CQI, PMI, PTI, or the RI.

In some examples, the base station 105 may select a format for control information. For example, base station 105 may select a downlink control information (DCI) format for the control information, and, in some examples a size of a payload for the control information may vary from format to format. Upon selecting the format for the control information, base station 105 may select a code rate for the control information based on a payload size for the selected format and the channel quality feedback data received from the UE 115. As a result, base station 105 may encode the control information based on the selected code rate, generate a control channel transmission based on the encoded control information, and transmit the control channel transmission to the UE 115 within at least one subband of the control channel.

Assuming a fixed payload size and given a SINR of a subband, UE 115 may determine a code rate that satisfies a reliability threshold (i.e., block error rate for a control channel). In an example, UE 115 may select a modulation scheme associated with the control information transmission and determine the code rate for at least one subband of the control channel based on the modulation scheme. In some cases, UE 115 may determine the code rate for a control channel based on a transmission index. The transmission index may indicate whether a transmission is a first transmission or a retransmission, and the UE 115 may determine the code rate accordingly. For example, the UE 115 may select a lower code rate for a retransmission that corresponds to a lower block error rate, and a higher code rate for an initial transmission that corresponds to a higher block error rate.

In some cases, base station 105 may configure the UE 115 with one or more DCI formats that the base station 105 may use for a future transmission of control information and/or data. UE 115 may identify a payload size of a control information transmission. For example, UE 115 may identify a payload size of each of the one or more DCI formats. In some cases, UE 115 may also identify a metric of a subband of a control channel and/or for all subbands of the control channel. The subband may be associated with a control channel and data channel. For example, the UE 115 may measure a reference signal received on the subband to determine a SINR for a control channel. Upon identifying the payload size of the one or more DCI formats and the SINR (e.g., of the control channel and/or of the subband), UE 115 may determine a code rate and/or aggregation level to meet a predefined reliability parameter, e.g., block error rate for a control channel, for each payload size of the one or more DCI formats. UE 115 may generate channel quality feedback data that including the determined code rate for each of the one or more DCI formats. UE 115 may transmit the channel quality feedback data to base station 105.

UE 115 may report the code rate to base station 105 using multiple techniques. According to a first technique, a set of code rates for a fixed modulation scheme (e.g., QPSK) may be defined. UE 115 may report to base station 105 an index of the highest code rate that satisfies a reliability threshold (e.g., block error rate). For example, UE 115 may identify an index from a set of indexes in a code rate table corresponding to the determined code rate. The set of indexes may correspond to a set of code rates, and the UE 115 may select a particular index for indicating a code rate that achieves the reliability threshold based on current channel conditions. The code rate table may be known by UE 115 and base station 105. As a result, UE 115 may transmit channel quality feedback data, including the identified index that maps to the determined code rate in the code rate table, to base station 105. In some cases, a higher modulation scheme may be used by UE 115 and base station 105. In this case, both a modulation scheme and code rate may be included in the code rate table, and the identified index may specify both a modulation scheme and a code rate. The base station 105 may receive feedback data including the identified index and use the corresponding code rate and modulation scheme for subsequent transmissions to the UE 115 in the subband, one or more subbands, or in an entire system bandwidth.

The UE 115 may determine an aggregation level based on the identified payload size, the determined code rate, and the determined reliability parameter. For example, based on a DCI payload size and the determined code rate, the UE 115 may determine an aggregation level that satisfies a reliability threshold (e.g., block error rate). UE 115 may report the determined aggregation level to base station 105 as part of the channel quality feedback data. In some examples, increasing the aggregation level may increase a likelihood that UE 115 is capable of successfully decoding a control channel. The channel quality feedback data may include at least one bit to indicate the determined aggregation level. For example, UE 115 may provide a bit indication to the base station 105 about the selection of one of the four aggregation levels (1, 2, 4 or 8). In some cases, UE 115 may use multiple bits to indicate an aggregation level. That is, UE 115 may use 2-bits to indicate one of the four aggregation levels. For example, the bit sequence "00" may indicate an aggregation level 1, "01" may indicate an aggregation level 2, "10" may indicate an aggregation level 4, and "11" may indicate an aggregation level 8. The bit indication may include more than two bits for indicating additional aggregation levels.

In some cases, multiple DCI formats may be defined with different payload sizes. UE 115 may determine a code rate separately for each DCI format and corresponding payload size and provide channel quality feedback data to the base station 105 indicating a code rate to be used for each DCI format. For example, UE 115 may determine a payload size for each of a set of DCI formats, and determine a set of code rates for a subband based on the determined payload sizes and the measurement of the received reference signal. The channel quality feedback data may include a mapping of each of the determined code rates to a respective payload size of the set of different payload sizes. Similarly, UE 115 may determine a set of aggregation levels based on the set of code rates. Each of the set of aggregation levels may correspond to a payload size of a set of different payload sizes. The channel quality feedback data may include a mapping of each of the determined aggregation levels to a respective payload size of the plurality of different payload sizes. In some cases, the DCI payloads may be indicated as part of the channel quality feedback data via a higher layer signaling.

Base station 105 may transmit a control channel transmission (e.g., in the subband) using a modulation and coding scheme selected based on the channel quality feedback data received from UE 115. In some cases, base station 105 may determine a code rate index from a set of indexes in a code rate table based on the channel quality feedback data. For example, base station 105 may parse a particular code rate index from the channel quality feedback data and use the index to determine a code rate from a code rate index table. Upon identifying the code rate from the code rate index table, base station 105 may encode control information based on the code rate corresponding to the code rate. In an example, base station 105 may determine an aggregation level from a set of aggregation levels based on the channel quality feedback data and encode control information using the determined aggregation level. In some examples, the control channel transmission may be generated based on the encoded control information. In some cases, base station 105 may determine that the channel quality feedback data includes a negative acknowledgment (NACK) for data transmitted via the subband, the transmitted data being encoded using a first code rate. In a retransmission of the data, base station 105 may encode the data using a second code rate that differs from the first code rate, and transmit the data encoded using the second code rate via the subband to UE 115. The second code rate, for example, may provide additional protection to increase the likelihood that the UE is able to successfully decode the data.

In some cases, UE 115 may receive from base station 105 configuration information instructing the UE 115 to perform a measurement on a number of subbands associated with one or more component carriers. UE 115 may select to measure on one or more subbands of the number of subbands based on the configuration information. In some cases, UE 115 may provide channel quality feedback data for one or more subbands of the number of subbands to base station 105. The channel quality feedback data may include channel state information for the control channel (e.g., for at least one subband of the control channel), channel state information for a set of subbands that includes the subband, or wideband channel state information.

In some examples, the selection of which subbands and which payload sizes on which to provide feedback may be based on a transmission index (e.g., a first transmission, a retransmission). UE 115 may determine to generate channel quality feedback data for a first subband based on identifying that decoding of information from a second subband was successful. For example, if a first transmission of a first subband is successful, instead of providing feedback to base station 105 for the first subband, UE 115 may provide channel quality feedback data to base station 105 of other subsequent subbands. The UE 115 may report on the other subbands as the code rate for the first subband is currently acceptable (e.g., because decoding was successful), and hence it is more efficient for the UE 115 to provide feedback on one or more other subsequent subbands.

In another example, UE 115 may determine to generate channel quality feedback data (e.g., for a subband) based on identifying that decoding of information from that subband was unsuccessful. For example, if a first transmission fails (e.g., UE 115 is able to decode sPDCCH transmission in a subband but fails to decode physical downlink shared channel (PDSCH) data within that subband), the importance of the UE 115 to successfully decoding a retransmission of sPDCCH and sPDSCH may increase, for example, to meet a latency specification (e.g., 1 ms). In such a case, the UE 115 may provide channel quality feedback data that is specific to a particular payload size and a particular subband corresponding to an increased reliability parameter (e.g., lower block error rate) for retransmission of the sPDCCH transmission.

The UE 115, for example, may store a set of code rate index tables 435 that each corresponding to a different block error rate, and select a code rate from a table corresponding to a desired block error rate. The UE 115 may thus select a code rate and/or aggregation level for the retransmission to provide higher protection to the control information and/or data being retransmitted than was provided to the initial transmission. For example, a code rate and/or aggregation level selected for an initial transmission may permit a higher block error rate than a code rate and/or aggregation level selected for a retransmission.

Moreover, by controlling the channel quality feedback data reporting to only a particular subband and payload size combination, the processing burden on the UE 115 may be reduced. To meet a latency specification, the UE 115 may generate a negative acknowledgement, calculate a code rate and/or aggregation level that is specific to a particular payload size and a particular subband, and transmit channel quality feedback data based on the code rate and the negative acknowledgement. The base station 105 may process the feedback data and adjust the code rate and/or aggregation level, thereby increasing the probability that the UE is able to receive the data to satisfy the latency specification. In such a case, it might be possible to send the sPDCCH channel quality feedback data along with a transport block acknowledgment message (e.g., ACK/NACK) to be used for a next transmission.

In some examples, reporting of channel quality feedback data of a control channel may be defined based on a feedback reporting type. For example, a reporting timeline associated with transmitting the channel quality feedback data may be based on a number of subband measurements, the type of measurement (e.g., CQI, PMI, PTI, RI) and a number of DCI payload sizes to check. In an example, the duration of the reporting timeline associated with transmitting the channel quality feedback data may be based on whether decoding of information from a particular subband, or a different, second subband, was successful. The duration of the reporting timeline associated with transmitting the channel quality feedback data, in some examples, may be based on a number of possible re-transmissions within a latency window.

In some examples, data channel (e.g., sPDSCH) and control channel (e.g., sPDCCH) feedback requests may be triggered either separately or jointly. For example, UE 115 may receive a feedback report trigger from base station 105 instructing the UE 115 to separately or jointly provide the channel quality feedback data. In separate triggering, for example, a shortened downlink control information (sDCI) may include two separate feedback reporting fields (e.g., CSI triggering fields) that indicate whether the UE 115 is to send feedback for a data channel, for a control channel, or both. For example, each feedback reporting field may include two bits, where depending on a higher layer configuration, each bit combination may be interpreted differently. For example, bit sequence "00" may trigger the UE 115 to report channel quality feedback data to the base station 105 for a control channel (e.g., sPDCCH). For joint triggering, each bit of a feedback reporting field may be considered separately. For example, the feedback reporting field may include two bits, where a first bit may indicate whether to report feedback for a data channel (e.g., report if bit is set to 1, and do not report if bit is set to 0) and a second bit may indicate whether to report feedback for a control channel.

The UE 115 may similarly separately or jointly provide channel quality feedback data for the data channel (e.g., sPDSCH) and control channel (e.g., sPDCCH). In some examples, when channel quality feedback data reporting is separate; but collides in time, either data feedback or control feedback, or both may be transmitted by UE 115 to base station 105. In some cases, the selection of any of the above options might be fixed, semi-static, or depending on the feedback type of data and control. If the reporting is separated, then the reporting timeline may also be different for sPDSCH reporting and sPDCCH reporting. For example, a faster reporting (e.g., a shorter duration reporting timeline) may be provide for sPDCCH reporting as compared to sPDSCH reporting.

System 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Figure 2:
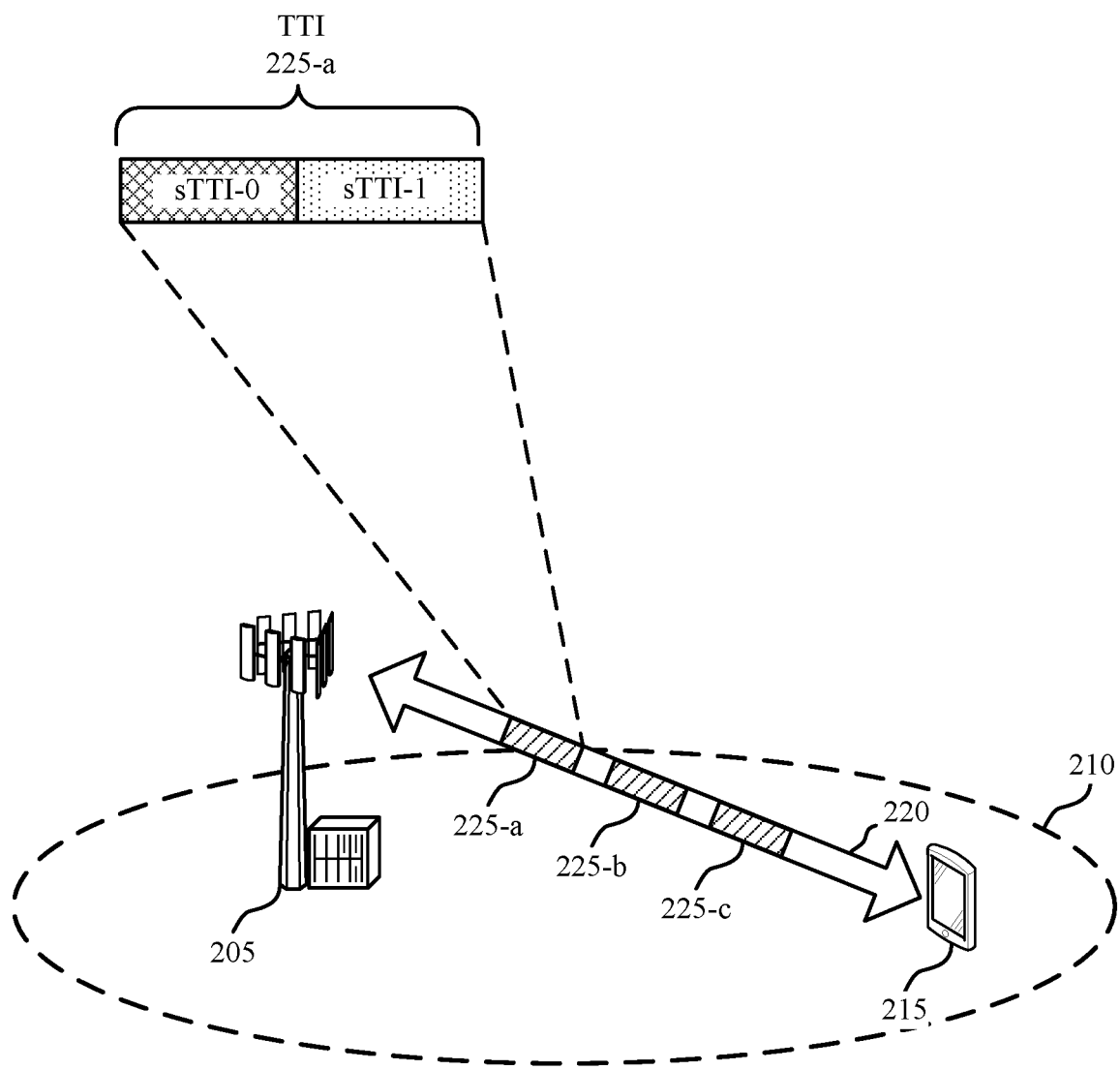
FIG. 2 illustrates an example of a system for wireless communication that supports dedicated channel state information reporting for a control channel, in accordance with aspects of the present disclosure.

FIG. 2 illustrates an example of a system 200 for wireless communication that supports dedicated channel state information reporting for a control channel, in accordance with aspects of the present disclosure. In some examples, system 200 may implement aspects of system 100. System 200 may include a base station 205 and a UE 215, which may be examples of the corresponding devices described with reference to FIG. 1. In the example of FIG. 2, the system 200 may operate according to a radio access technology (RAT) such as a 5G or NR RAT, although techniques described herein may be applied to any RAT and to systems that may concurrently use two or more different RATs.

UE 215 may establish a connection (e.g., bidirectional link 220) with base station 205. Base station 205 and UE 215 may communicate via the bidirectional link 220 within a coverage area 210. Base station 205 and UE 215 may exchange multiple frames via the bidirectional link 220. Each frame may include ten 1 ms subframes numbered from 0 to 9. A subframe may be further divided into two 0.5 ms slots, each of which contains 6 or 7 modulation symbol periods. In some cases, the subframe may be the smallest scheduling unit, also known as a transmission time interval (TTI). In other cases, a TTI may be shorter than a subframe or may be dynamically selected (e.g., in short TTI bursts or in selected component carriers using shortened TTIs (sTTI)). In some cases, the bidirectional link 220 may be used for providing dedicated channel state information reporting for a control channel. Base station 205 and UE 215 may support enhancing a reliability of a control channel by providing a dedicated feedback process for the control channel.

In some examples, base station 205 may set an initial modulation and coding scheme for UE 215. For example, base station 205 may set an initial modulation and coding scheme for UE 215 that may be determined during a connection establishment procedure (e.g., random access channel (RACH) procedure). Subsequent to the connection establishment procedure, base station 205 may transmit a reference signal to UE 215 using one or more resource elements. A resource element may consist of one symbol period and one subcarrier (e.g., a 15 KHz frequency range). A resource block may contain 12 consecutive subcarriers in the frequency domain and 7 consecutive OFDM symbols in the time domain (1 slot). The number of bits carried by each resource element may depend on the modulation scheme (the configuration of symbols that may be selected during each symbol period). Thus, the more resource blocks that UE 215 receives, the higher the modulation scheme, and the higher the data rate may be for UE 215.

Base station 205 may also transmit a reference signal to UE 215 during a sTTI or a TTI. For example, base station 205 may transmit a reference signal during a TTI 225-a. The TTI 225-a may include two or more sTTI; such as sTTI-0 230 and sTTI-1 235. In some examples, base station 205 may transmit a reference signal per sTTI or per TTI. As such, base station 205 may transmit a reference signal to UE 215 during TTI 225-a, TTI 225-b, and TTI 225-c. In some cases, the reference signal may be transmitted by base station 205 in each subband of a control channel. The control channel may be a sPDCCH that includes scheduling, power control, and positive acknowledgements (ACKs) or negative acknowledgements (NACKs). In some examples, base station 205 may transmit control information and data with a reference signal to UE 215. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information may be transmitted during a sTTI or a TTI of a downlink channel.

In some examples, the reference signal may be embedded within an overall signal bandwidth and correspond to a resource element or resource block. In some cases, base station 205 may transmit control information with the reference signal to UE 215 using a modulation scheme. For example, base station 205 may transmit control information using QPSK. In some cases, higher order modulations such as 16QAM may also be used by base station 205 for transmitting the reference signal. Additionally, base station 205 may transmit the control information using QPSK or QAM and SFBC. The modulation scheme used by base station 205 may be static or dynamic. As highlighted above, base station 205 may set an initial modulation and coding scheme for UE 215 based on a RACH procedure. In some cases, to enhance the reliability of a control channel a dedicated feedback process for the control channel may be configured with a logical antenna configuration. The logical antenna configuration may be a single-port CSI RS configuration.

UE 215 may receive the reference signal from base station 205 during a sTTI or a TTI. For example, UE 215 may receive the reference signal via at least one subband of a control channel (e.g., sPDCCH) via bidirectional link 220. Upon receiving the reference signal, UE 215 may perform a measurement on the reference signal (e.g., SINR) to identify one or more metrics. The UE 215 may perform this measurement to identify a channel quality (e.g., of a sPDCCH transmission) related to the reference signal transmission. UE 215 may determine a code rate for the control channel (e.g., for at least one subband of the control channel) based on the measurement. In some cases, UE 215 may also determine an aggregation level based on the code rate. In other examples, UE 215 may determine a channel quality indicator (CQI), a pre-coding matrix indicator (PMI), a precoding type indicator (PTI), or a rank indicator (RI) based on the measurement.

UE 215 may generate channel quality feedback data indicating the determined code rate and/or aggregation level to be used for transmission within the subband(s). In some examples, the channel quality feedback data may be wideband channel quality feedback data corresponding to an entire bandwidth of a control channel. The UE 215 may transmit the generated feedback to base station 205 via bidirectional link 220. In some examples, the channel quality feedback data for the subband(s) may include the determined CQI, the PMI, the PTI, or the RI. In some examples, UE 215 may transmit the channel quality feedback data in multiple sTTIs or TTIs to base station 205, e.g. TTIs 225. In some cases, the channel quality feedback data may include a set of acknowledgement messages. For example, UE 215 may generate HARQ ACKs or NACKs, which UE 215 may transmit to base station 205 on a physical uplink control channel (PUCCH) via the subbands.

Figure 3:
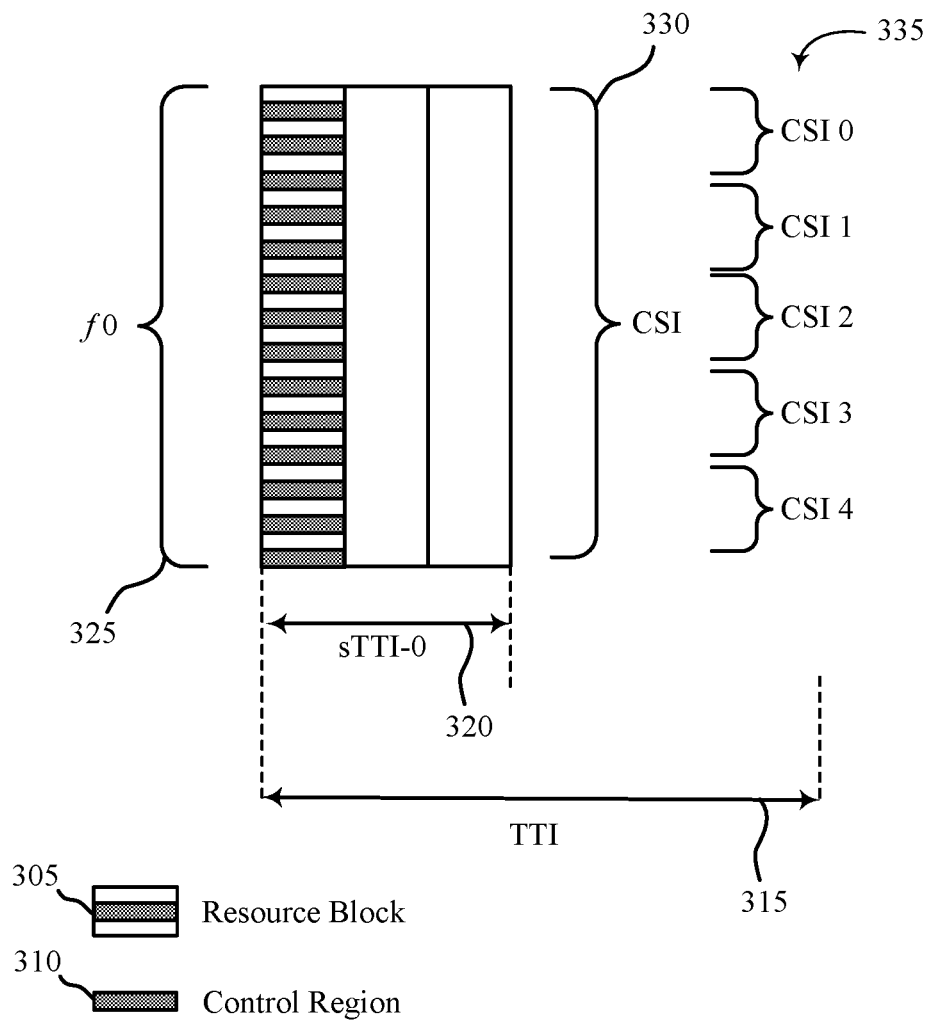
FIG. 3 illustrates an example of a configuration that supports dedicated channel state information reporting for a control channel in accordance with aspects of the present disclosure.

In some examples, UE 215 may generate channel quality feedback data per sTTI or a TTI for one or more subbands or an overall system bandwidth of a control channel. In an example, UE 215 may generate channel quality feedback data per subband per sTTI of a TTI. FIG. 3 illustrates an example of a configuration 300 that supports dedicated channel state information reporting for a control channel in accordance with aspects of the present disclosure. Configuration 300, for example, depicts a TTI 315 that may include a sTTI-0 320. Although only one sTTI is illustrated in the example of FIG. 3, the configuration 300 may include multiple TTIs and multiple sTTIs within a TTI. sTTI-0 320 may span one or more symbols. Each symbol of sTTI-0 320 may include multiple physical resource blocks 305, and a control region 310 is provided within each resource block 305.

UE 215 may receive from base station 205 configuration information instructing the UE 215 to perform a measurement on a number of subbands associated with one or more component carriers. As a result, UE 215 may generate channel quality feedback data that includes channel state information (e.g., CSI 0) for a specific subband or a number of subbands. That is, UE 215 may generate channel state information for a single subband or for a number of subbands associated with a symbol in sTTI-0. In the case, of multiple subbands, UE 215 may generate channel state information for each individual subband. For example, UE 215 may generate CSI 0, CSI 1, CSI 2, CSI 3, and CSI 4 of the CSI set 335 that corresponds to a separate subband.

In some cases, UE 215 may select to measure on one or more subbands of the number of subbands based on a UE configuration. In an example, UE 215 may generate wideband channel state information. For example in FIG. 3, CSI 330 may be a wideband channel state information generated by UE 215. The wideband channel state information may span an entire bandwidth of the control channel, i.e., f0 325. UE 215 may also in some cases determine a code rate for each subband and provide the determined code rate as part of the channel quality feedback data. The channel quality feedback data may include the code rate or a code rate index, or an aggregation level or an aggregation level index. In some examples, the channel quality feedback data may also include CSI including one or more of the determined CQI, the PMI, the PTI, or the RI of a subband as part of the channel quality feedback data to base station 205. Base station 205 may receive the channel quality feedback data for the subband in response to the reference signal during sTTI-0 320.

In some examples, base station 205 may select a format for control information. For example, base station 105 may select a DCI format for the control information. Upon selecting the format for the control information, base station 205 may determine a payload size of the selected format. Based on the payload size, base station 205 may select a code rate for the control information based on the determined payload size and the channel quality feedback data. As a result, base station 205 may encode the control information based on the selected code rate. In some examples, the control channel transmission is generated based on the encoded control information. Base station 205 may transmit to UE 215 the encoded control information on a subband of a control channel.

UE 215 may receive the encoded control information on the subband of the control channel. For example, in FIG. 3 the encoded control information may be received during a control region 310 of a resource block 305. Upon receiving the encoded control information, UE 215 may identify a payload size of the control information transmission and a metric (e.g., SINR, signal to noise (SNR) ratio, channel quality indicator (CQI), received signal strength indicator (RSSI)) of the subband of the control channel. For example, UE 215 may identify that a payload size is associated with a DCI format, and the UE 215 may also identify a SINR for the subband. The DCI format may include information for uplink resource allocation and descriptions about downlink data transmitted to the UE 215.

Based on identifying the payload size of the control information and the metric of the subband, UE 215 may determine a reliability parameter for the control channel. For example, UE 215 may determine a block error rate for the control channel specified by a low latency application. In some deployments of low latency applications, a certain block error rate (e.g., 1%, 0.1%, or lower) may be specified. A such, the UE 215 may determine the code rate for the subband based on the identified payload size, the metric of the subband, and the determined reliability parameter. For example, the code rate for the subband may be based on the identified DCI format, the SINR of the subband, and the determined block error rate. Assuming a fixed payload size and given a SINR of a subband, UE 215 may determine a code rate that satisfies a reliability threshold (i.e., block error rate for a control channel). In some cases, UE 215 may select a modulation scheme associated with the control information transmission and determine the code rate for the subband based on the modulation scheme.

Figure 4:
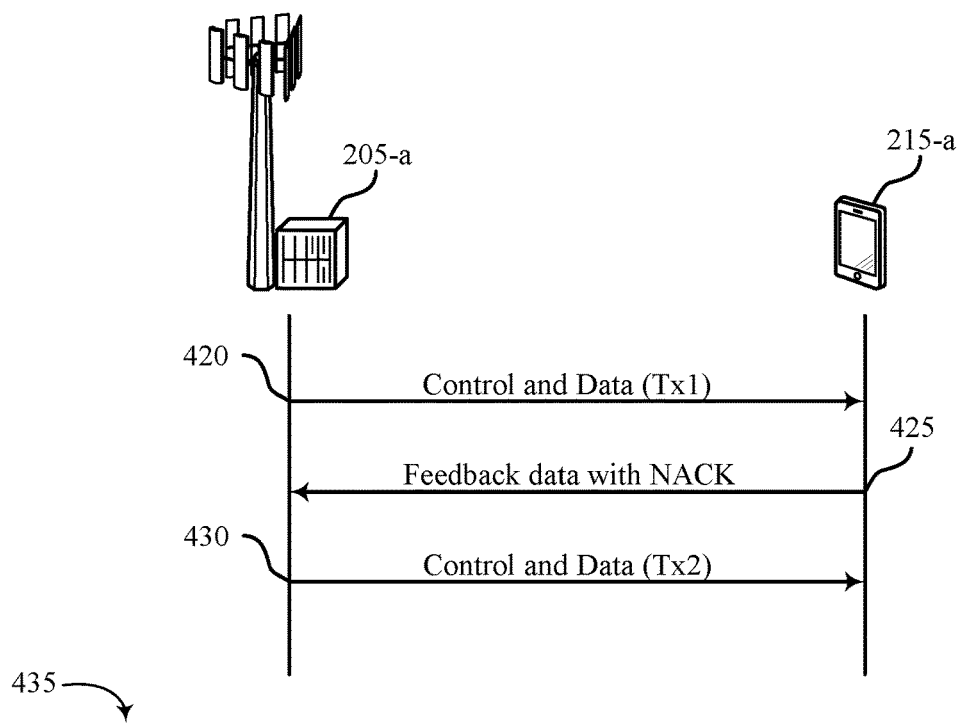
FIG. 4 illustrates an example of a configuration 400 that supports dedicated channel state information reporting for a control channel in accordance with aspects of the present disclosure.

UE 215 may report the channel quality feedback data including the determined code rate to base station 205 using one or multiple techniques. In the case of multiple transmissions by the base station 205, a first transmission may have a lower reliability parameter (e.g., permit a higher block error rate) compared to a second subsequent transmission. This may support balancing the efficiency-latency tradeoff of the system 200. FIG. 4 illustrates an example of a configuration 400 that supports dedicated channel state information reporting for a control channel in accordance with aspects of the present disclosure. Configuration 400, for example, depicts a base station 205-*a* and a UE 215-*a*, which may be examples of the corresponding devices described with reference to FIGS. 1 and 2. Configuration 400 illustrates an example of a 2-shot transmission between base station 205-*a* and UE 215-*a*. In the case of multiple transmissions by the base station 205-*a*, configuration 400 illustrates a probability of a successful transmission assuming two transmission opportunities are possible during a subband of an sTTI, and reasons for a first transmission having a lower reliability parameter (e.g., block error rate) compared to a second subsequent transmission.

At 420, base station 205-*a* may transmit to UE 215-*a* control information using one or more subbands of a control channel (e.g., sPDCCH) and data using a data channel within the same one or more subbands, but at a different time. For example, a sTTI may correspond to a subband and the control channel may be a first portion of the sTTI (e.g., one or more symbol periods of the sTTI) and the data channel may be a second portion of the sTTI (e.g., remaining symbol periods of the sTTI). In an example, the probability of UE 215-*a* successfully decoding the control information and data information for a two-transmission opportunity is defined by the following equation:

$$P_{success} = P_{C,TX_1}P_{D,TX_1} + (1-P_{C,TX_1})P_{D,TX}P_{C,TX_2}P_{D,TX_1} + P_{C,TX_1}(1-P_{D,TX_1})P_{NACK}P_{C,TX_2}P_{D,TX_2}$$

where the $P_{C,TX_1}P_{D,TX_1}$ term represents the probability that both the control channel (e.g. sPDCCH) and the data channel (e.g., sPDSCH) are decoded successfully, the $(1-P_{C,TX_1})P_{D,TX}P_{C,TX_2}P_{D,TX_1}$ term represents the probability that the first control channel is not detected by UE 215-*a*, that the base station 205-*a* correctly detects the data transmission $(P_{D,TX})$, and the second control channel and data channel of a subsequent subband are both decoded correctly by UE 215-*a*, and the $P_{C,TX_1}(1-P_{D,TX_1})P_{NACK}P_{C,TX_2}P_{D,TX_2}$ term represents the probability that the first control channel (e.g., sPDCCH) is detected by UE 215-*a*, but the first data channel (e.g., sPDSCH) is not decoded successfully by UE 215-*a*, at 425, feedback data including a NACK is transmitted by UE 215-*a* to base station 205-*a*. As a result, at 430, base station 205-*a* may adjust a code rate and/or an aggregation level based on the feedback data for a second control channel and data channel transmission to increase a likelihood of successfully detection and decoding by UE 215-*a*.

UE 215-*a* may determine to generate channel quality feedback data for a subband(s) based on identifying that decoding of information from a second subband was successful. For example, if a first transmission of a first subband is successful, instead of providing feedback to base station 205-*a* for the first subband, UE 215-*a* may provide channel quality feedback data to base station 205-*a* of other subsequent subbands. In some cases, the UE 215-*a* may transmit the channel quality feedback data using different DCI formats, and adopt different reliability thresholds (e.g., higher or lower block error rate) associated with different transmission indices.

In another example, UE 215-*a* may determine to generate the channel quality feedback data for a particular subband based on identifying that decoding of information from that subband was unsuccessful. For example, if a first transmission fails (e.g., sPDCCH is decoded, but data decoding fails), it becomes important to ensure that the second sPDCCH and sPDSCH can be decoded properly. In such a case, the UE 215-*a* may provide channel quality feedback data, for a current DCI format with a defined reliability threshold (e.g., block error rate), of a next sPDCCH transmission. Thus, base station 205-*a* may select a code rate for an initial transmission of control information and/or data in a subband of a control channel to be less conservative than a code rate for a retransmission of the control information and/or data in the subband after an unsuccessful decode of the initial transmission.

A set of code rates with a fixed modulation scheme (e.g., QPSK, QAM) may be defined. For example, code rate index table 435 may include a code rate index column 440, a modulation (scheme) column 445, a code rate column 450, an aggregation level column 455, and a payload size column 460. Code rate index table 435 may correspond to a particular reliability parameter (e.g., minimum block error rate). In some cases, the UE 215 may store multiple code rate index tables 435, where each table corresponds to a different reliability parameter (e.g., each corresponds to a different minimum block error rate). In some examples, the code rate index table 435 may include a column specifying a set of different minimum block error rate that may be used to select a code rate for a desired minimum block error rate.

To determine a code rate, UE 215 may, for example, measure a reference signal received in a particular subband, determine a SINR based on the measured reference signal, and then select a code rate corresponding to the measured SINR that satisfies a reliability threshold (e.g., block error rate threshold). For example, UE 215 may determine a coding rate by looking up a code rate in a CQI table that corresponds to a measured reference signal quality or range of measured reference signal quality that satisfies a reliability threshold. UE 215 may have been configured, for example, by base station 205, with multiple CQI tables, and each CQI table may be defined for a certain reliability threshold and/or range of measured CQI. In some cases, base station 205 may indicate to UE 215 which CQI table to use, for example, by indicating a reliability threshold. In some examples, the measured reference signal may correspond to a particular modulation scheme (e.g., 16 QAM or 64QAM) and a payload size, and the UE 215 may select a code rate corresponding to the determined SINR and one or more of the modulation scheme and the payload size. In some examples, the UE 215 may generate feedback data that includes the selected code rate (e.g., feedback data includes CRs). In some examples, the UE 215 may determine an index that corresponds to the selected code rate and generate feedback data that includes the determined index (e.g., feedback data includes CRIs). As a result, the UE 215 may transmit channel quality feedback data including the identified index that maps to the determined code rate to base station 205.

In some examples, the UE 215 may determine an aggregation level based on the code rate. For example, the code rate index table 435 may provide a relationship between a code rate and an aggregation level, and the UE 215 may determine select a code rate corresponding to the measured SINR and determine an aggregation level corresponding to the selected code rate. UE 215 may also determine the aggregation level based on a payload size, the determined code rate, and the determined reliability parameter. For example, based on a DCI payload size and the determined code rate, the UE 215 may determine an aggregation level that satisfies a reliability threshold (e.g., block error rate). In some examples, the number of aggregation levels in aggregation level column 455 may be fewer than the number of code rate indices in column 440. For example, AL=1 may correspond to a code rate=0.8 (e.g., $AL_0$ through $AL_4$ may be associated with a code rate of 0.8), and AL=2 may correspond to a code rate of 0.7 (e.g., $AL_5$ through $AL_8$ may be associated with a code rate of 0.7). Then, any code rate in the table 435 between 0.7 and 0.8 may be covered by AL=2. For example, any code rate in aggregation level column 455 between 0.7 and 0.8 may be covered by an aggregation level (e.g., AL2). UE 215 may report the determined aggregation level to base station 205 as part of the channel quality feedback data.

The channel quality feedback data may include at least one bit to indicate the determined aggregation level. For example, UE 215 may provide a bit indication to the base station 205 about the selection of one of four aggregation levels (1, 2, 4 or 8) of FIG. 4. In some cases, UE 215 may use multiple bits to distinguish between the aggregation levels. For example, UE 215 may use 2-bits to indicate one of the four aggregation levels. The bit sequence "00" may indicate AL1, "01" may indicate an AL2, "10" may indicate an AL4, and "11" may indicate an AL8. Other numbers of bits and other numbers of aggregation levels, as well as other relationships between bit sequences and aggregation levels may be defined.

In some cases, multiple DCI formats may have different payload sizes. UE 215 may determine a code rate and provide channel quality feedback data to the base station 205, separately for each DCI format. For example, UE 215 may determine a payload size for each of a set of DCI formats, and determine a set of code rates for a subband for each payload size. Similarly, UE 215 may consult code rate index table 435 of FIG. 4 to determine a code rate for each DCI format. The channel quality feedback data may map each of the determined code rates to a respective payload size. For example, in a particular subband of a control channel, a code rate $CR_0$ may be associated with a DCI format 0, a code rate $CR_1$ may be associated with a DCI format 1. In some examples, multiple DCI formats may have a same payload size and a same code rate.

UE 215 may also determine an aggregation level corresponding to a code rate and payload size. The channel quality feedback data may include a mapping of each of the determined aggregation levels to a respective payload size of the set of different payload sizes. In some cases, the DCI payloads may be indicated as part of the channel quality feedback data via a higher layer signaling. In an example, the code rate(s) for the subband(s) may be based on a number of layers and a transmission mode for control information transmission (e.g., a common reference signal (CRS)-based transmission mode or a demodulation reference signal (DMRS)-based transmission mode). In some examples, a control information transmission (e.g., a sPDCCH transmission) may be CRS-based or DMRS-based. If CRS-based, the sPDCCH transmission may be coded using a SFBC, and the channel quality feedback data reporting (e.g., CSI reporting) may be generated based on a received CRS. In some examples, the channel quality feedback data reporting may be a function of a number of CRS ports. If DMRS-based, the base station 205 may transmit the control information transmission using a single layer, and the UE 215 may define and use a single-port CSI-RS and interference measurement resource (IMR) to generate the channel quality feedback data.

In some cases, to enhance the reliability of a control channel a dedicated feedback process for the control channel may be configured based on a number of layers and a transmission mode for control information transmission. For instance, the dedicated feedback process for the control channel may be configured with a logical antenna configuration. The logical antenna configuration may be a single-port CSI RS configuration. For example, in the case of DMRS-based sPDCCH, because the control information transmission is transmitted via a single-layer, a single-port CSI-RS and interference measurement resource may be defined and used by UE 215 for generating channel quality feedback data.

Base station 205 may receive from the UE 215 the channel quality feedback data for at least one subband. Upon receiving the channel quality feedback data, base station 205 may transmit a control channel transmission in the subband using a modulation and coding scheme selected based on the channel quality feedback data received from UE 215. In some cases, prior to the transmitting, base station 205 may determine a code rate index from a set of indexes in a code rate index table based on the channel quality feedback data. For example, base station 205 may consult a code rate index table such as code rate index table 435 of FIG. 4. Base station 205 may process feedback data received from the UE 215 to determine a code rate index requested by the UE 215.

Base station 205 may use the code rate index table 435 to determine a code rate correspond to the received code rate index. For subsequent transmissions in the subband, base station 205 may encode control information based on the code rate corresponding to the received code rate index. In some cases, base station 205 may determine that the channel quality feedback data includes a NACK for data previously transmitted to the UE 215 via the subband, where the data was encoded using a first code rate. Base station 205 may encode the data using a second code rate that differs from the first code rate, and transmit the data encoded using the second code rate via the subband to UE 215.

Base station 205 may also determine an aggregation level from a set of aggregation levels based on channel quality feedback data received from the UE 215, and encode control information using the determined aggregation level. In some examples, the base station 205 may process feedback data received from the UE 215 that includes an aggregation level index (e.g., 2 bit sequence), and determine which aggregation level to use based on the aggregation level index. In another example, base station 205 may consult a code rate index table such as code rate index table 435 of FIG. 4 to identify an aggregation level based on information included in the channel quality feedback data. In some examples, the base station 205 may process feedback data received from the UE 215 that includes a code rate index. Base station 205 may use the code rate index table 435 to determine a code rate correspond to the received code rate index, and then determine an aggregation level corresponding to the code rate.

Figure 5:
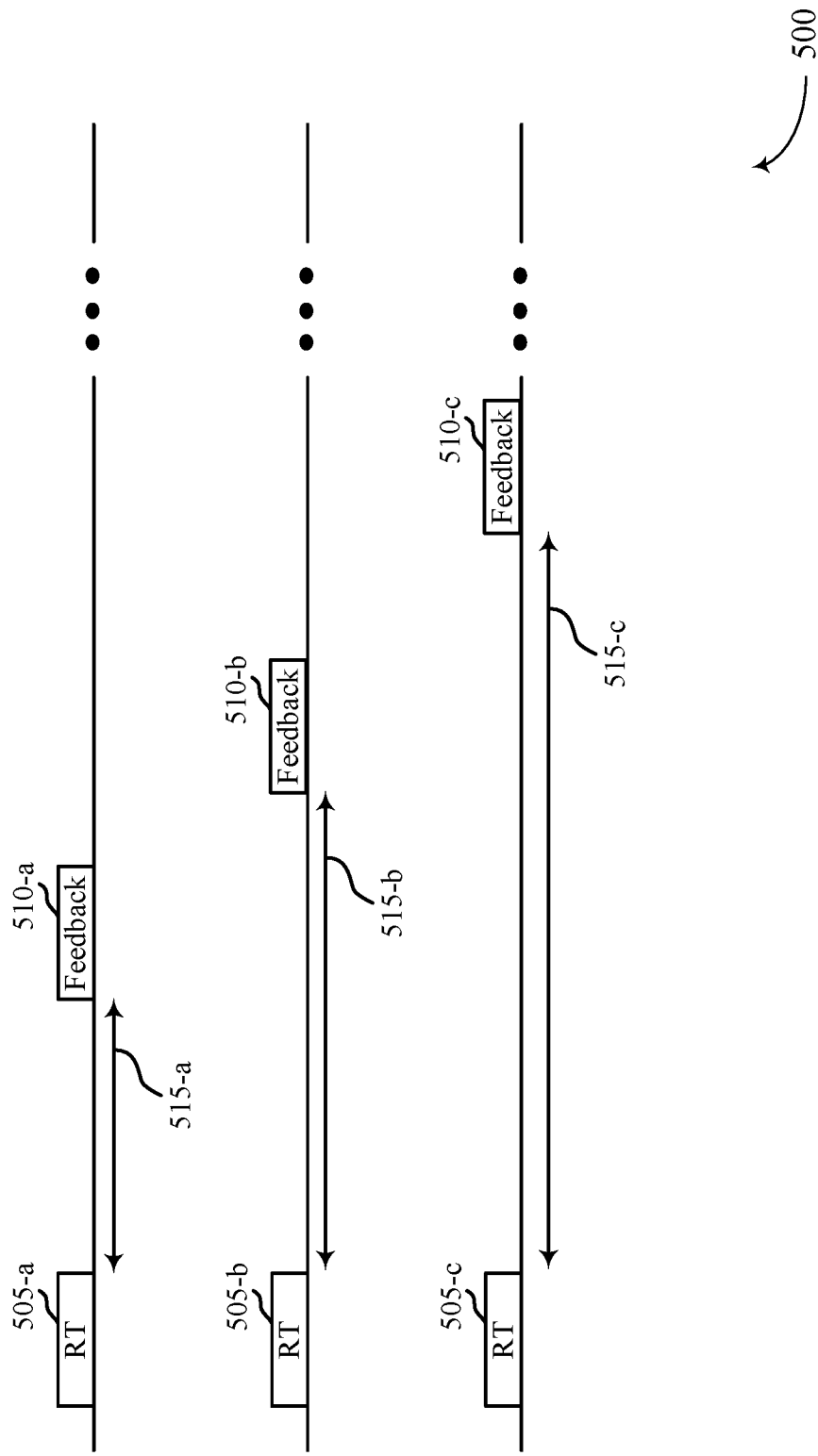
FIG. 5 illustrates an example of a timing diagram 500 that supports dedicated channel state information reporting for a control channel in accordance with aspects of the present disclosure.

In some examples, reporting of channel quality feedback data may be based on a feedback reporting type. FIG. 5 illustrates an example of a timing diagram 500 that supports dedicated channel state information reporting for a control channel in accordance with aspects of the present disclosure. By way of example, wireless communications shown in FIG. 5 include communications (or transmissions) by a base station and a UE, which may be examples of the corresponding devices described with reference to FIGS. 1 and 2. A base station may transmit a feedback report trigger (RT) (i.e., RT 505-a, RT 505-b, and/or RT 505-c) during a sTTI in a subband of a control channel to trigger the UE to provide channel quality feedback data on at least one subband or wideband channel quality feedback data. The subband and control channel may correspond to a sTTI of a TTI, as described elsewhere herein. A UE may perform a measurement on a reference signal and provide any reporting (e.g., channel quality feedback data) to a base station. In some cases, a reporting timeline (e.g., reporting timeline 515-a, 515-b, and/or 515-c) may specify when, relative to a RT 505, a UE is to report channel quality feedback data (e.g., feedback 510-a, 510-b, and/or 510-c) to the base station. A reporting timeline may also be based on a reporting mode.

In some cases, the duration of the reporting timeline 515-a, 515-b, and/or 515-c may be based on a number of subband measurements, or a measurement type, or a number of payload sizes for control information, or any combination thereof. For example, reporting timeline 515-a may be shorter, and correspond to a UE providing feedback data on a single subband and a single payload size (e.g., due to a prior unsuccessful decoding of a control information transmission via the single subband). Reporting timeline 515-b may be longer than timeline 515-a and may correspond to a UE providing feedback data (i.e., feedback 510-b) on multiple subbands for a single payload size, or on a single subband for multiple payload sizes. Reporting timeline 515-c may correspond to a UE providing feedback data (i.e., feedback 510-c) on multiple subbands and on multiple payload sizes. As such, in the case where a UE is to provide feedback data on multiple subbands and multiple payload sizes, the reporting timeline (e.g., reporting timeline 515-c) may be longer in duration compared to a reporting timeline (e.g., reporting timeline 515-b) for which a UE performed measurements on fewer subbands. For example, for reporting timeline 515-b, UE may perform a measurement on two subbands. For reporting timeline 515-c, UE may perform a measurement on more subbands (e.g., four subbands); as such the reporting timeline 515-c may be longer compared to reporting timeline 515-b.

Similarly, a reporting timeline may be shorter or longer in duration based on whether a UE has to determine a code rate for each of multiple payload sizes in a subband, or for multiple subbands. For example, a UE may identify a payload size of each of one or more DCI formats within a single subband. In some cases, the UE may also identify a metric of the subband of a control channel. For example, a UE may measure a reference signal received on the subband to determine a SINR for a control channel. Upon identifying the payload size of the one or more DCI formats and the SINR of the subband, the UE may determine a code rate and/or aggregation level to meet a predefined reliability parameter, e.g., block error rate for a control channel, for each payload size of the one or more DCI formats of the subband. The UE may generate channel quality feedback data including the determined code rate for each of the one or more DCI formats. UE may transmit the channel quality feedback data to base station. If the UE is determining a code rate for each of multiple different payload sizes in a subband, the reporting timeline may vary based on the number of different payload sizes to give the UE to determine a code rate for each payload size. A reporting timeline may be shorter (e.g., reporting timeline 515-a) for a UE determining fewer code rates for fewer subbands for fewer payload sizes, and may be greater for a UE determining more code rates for more subbands for more payload sizes (e.g., reporting timeline 515-b).

In some cases, a reporting timeline associated with transmitting channel quality feedback data may be based on whether decoding of information from a subband was successful. For example, reporting timeline 515-a may be shorter in duration compared to reporting timeline 515-b because the UE did not successfully decode data transmitted a subband. The UE may attempt to quickly provide the channel quality feedback data to the base station, so that the base station may retransmit within a latency specification. In an example, the duration of the reporting timeline associated with transmitting the channel quality feedback data, in some examples, may be based on a number of possible re-transmissions to meet a latency specification of a low latency application (e.g., number of possible re-transmissions with 1 ms).

In some examples, the feedback report trigger 505 may instruct the UE 215 to separately or jointly provide the channel quality feedback data. In some cases, data channel (e.g., sPDSCH) and control channel (e.g., sPDCCH) feedback requests may be triggered either separately or jointly. For example, UE 215 may receive a feedback report trigger 505 from base station 205 instructing the UE 215 to separately or jointly provide the channel quality feedback data. In separate triggering, for example, feedback report trigger 505 may include a shortened downlink control information (sDCI) that may have two separate feedback reporting fields (e.g., CSI triggering fields) to indicate whether the UE 215 is to send feedback for a data channel, for a control channel, or both. For example, each feedback reporting field may include two bits, where depending on a higher layer configuration, each bit combination may be interpreted differently. For example, bit sequence "00" may trigger the UE 215 to report channel quality feedback data to the base station 205 for a control channel (e.g., sPDCCH). For joint triggering, each bit of a feedback reporting field may be considered separately by the UE. For example, the feedback reporting field may include two bits, where a first bit may indicate whether to report feedback for a data channel (e.g., report if bit is set to 1, and do not report if bit is set to 0) and a second bit may indicate whether to report feedback for a control channel.

The UE 215 may similarly separately or jointly provide channel quality feedback data for the data channel (e.g., sPDSCH) and control channel (e.g., sPDCCH). In some examples, when channel quality feedback data reporting is separate; but collides in time, either data feedback or control feedback, or both may be transmitted by UE 215 to base station 205. In some cases, the selection of any of the above options might be fixed, semi-static, or depending on the feedback type of data and control. If the reporting is separated, then the reporting timeline may also be different for sPDSCH reporting and sPDCCH reporting. For example, a faster reporting (e.g., a shorter reporting timeline) may be provide for sPDCCH reporting as compared to sPDSCH reporting.

Figure 6:
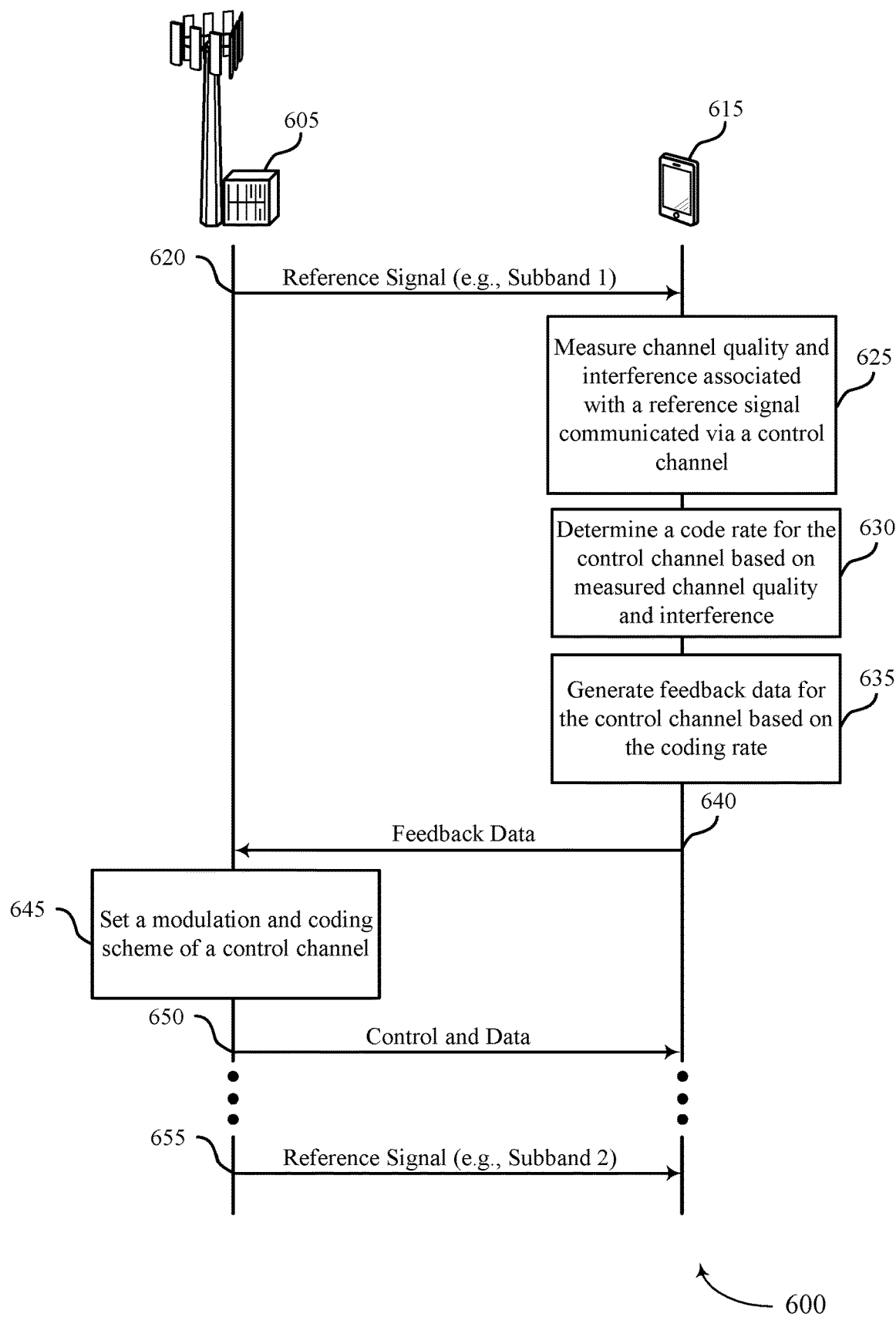
FIG. 6 illustrates an example of a process flow that supports dedicated channel state information reporting for a control channel in accordance with various aspects of the present disclosure.

FIG. 6 illustrates an example of a process flow 600 that supports dedicated channel state information reporting for a control channel in accordance with various aspects of the present disclosure. In some examples, process flow 600 may implement aspects of system 100 and 200. Base station 605 and UE 615 may be examples of the corresponding devices described with reference to FIGS. 1 and 2.

In the following description of the process flow 600, the operations between the base station 605 and UE 615 may be transmitted in a different order than the exemplary order shown, or the operations performed by base station 605 and UE 615 may be performed in different orders or at different times. Certain operations may also be left out of the process flow 600, or other operations may be added to the process flow 600. In some examples, process flow 600 may commence with base station 605 establishing a connection with UE 615. Base station 605 may provide radio resources to UE 615 for respective uplink communications. In an example, base station 605 may also provide radio resources to UE 615 for respective downlink communications.

At 620, base station 605 may transmit a reference signal in a control channel, and a UE 615 may receive a reference signal in the control channel. In some examples, the reference signal may be transmitted in one or more subbands of the control channel and may be received in a subband of the control channel. At 625, UE 615 may measure channel quality and interference associated with the reference signal communicated via a control channel. In an example, a non-zero power (NZP)-CSI-RS may be used for channel measurement and IMR for interference measurement. In a CRS-based mode, for example, a CRS may be used for both types of measurements. In some examples, the reference signal may be communicated via a subband of the control channel. In some cases, UE 615 may determine at least one of a SINR, CQI, a PMI, a PTI, or a RI, or a combination thereof based on the measuring.

At 630, UE 615 may determine a code rate for the control channel based on the measured channel quality and interference. In some examples, the code rate may be determined for a subband of the control channel. At 635, UE 615 may generate channel quality feedback data for the control channel, for example, one or more subbands of the control channel, based on the determined code rate. At 640, UE 615 may transmit the channel quality feedback data to base station 605. In some cases, the channel quality feedback data may include an indicator of CQI, a determined code rate, an indicator of an AL, an indicator of the transmission index, or the like. Base station 605 may determine a code rate based on the feedback data in a similar manner to how the UE determined the code rate corresponding to the feedback data, for example, using a CQI table.

At 645, base station 605 may set a modulation and coding scheme of the control channel. For example, the modulation and coding scheme may be set for a first subband or a second subband. In some examples, base station 605 may set a modulation and coding scheme based on the received channel quality feedback data from UE 615. For example, base station 605 may set the modulation and coding scheme for subband 1, or subband 1 and subband 2, or an entire bandwidth of the control channel. At 650, base station 605 may transmit control and data based on the selected modulation and coding scheme to UE 615. In some cases, base station 605 may transmit control and data based on the code rate indicated by UE 615. Similarly, base station 605 may transmit a reference signal, at 655 based on the set modulation and coding scheme. In some cases, base station 605 may transmit a reference signal based on the code rate indicated by UE 615.

UE 615 may determine to generate channel quality feedback data for the control channel (e.g., one or more subband of the control channel) based on identifying that decoding of information from that control channel (e.g., one or more subbands of the control channel) was unsuccessful. For example, if a first transmission fails (e.g., the UE 615 is able to decode control channel transmission in a subband but fails to decode a data channel within that subband), the importance of the UE 615 to successfully decode a retransmission of a control channel transmission and a data channel transmission may increase, for example, to meet a latency specification. In such a case, the UE 615 may provide channel quality feedback data that is specific to a particular payload size and a particular subband corresponding to an increased reliability parameter (e.g., lower block error rate) for retransmission of the control channel transmission.

Thus, by controlling the channel quality feedback data reporting to only a particular control channel (e.g., a particular subband of the control channel) and payload size combination, the processing burden on the UE may be reduced enabling the UE to transmit channel quality feedback data that a base station may use to adjust the code rate and/or aggregation level in an effort to increase the probability is able to successfully decode a retransmission.

Figure 7:
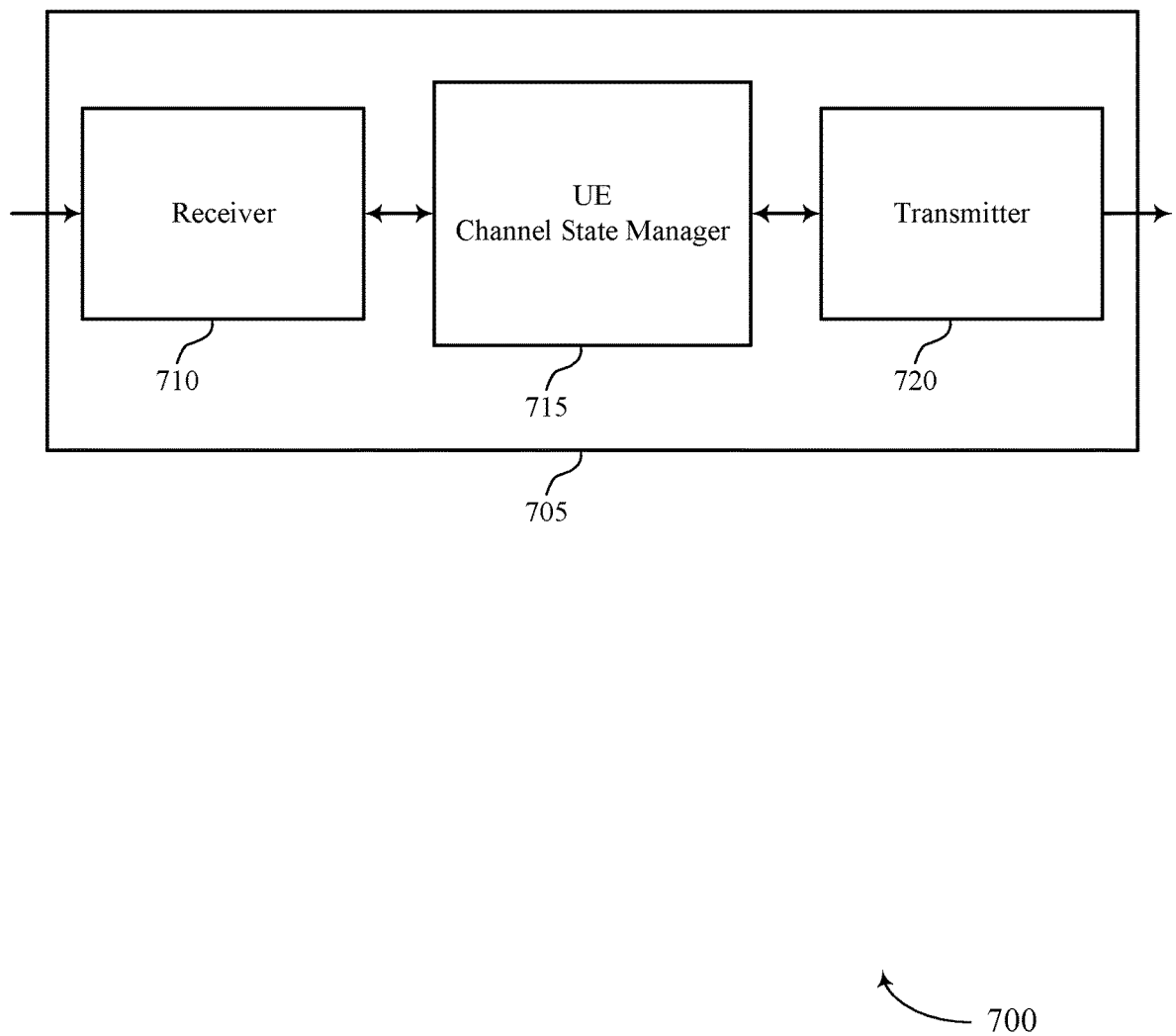
FIGS. 7 through 9 show block diagrams of a device that supports dedicated channel state information reporting for a control channel in accordance with aspects of the present disclosure.

FIG. 7 shows a block diagram 700 of a wireless device 705 that supports dedicated channel state information reporting for a control channel in accordance with aspects of the present disclosure. Wireless device 705 may be an example of aspects of a UE 115 as described herein. Wireless device 705 may include receiver 710, UE channel state manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to dedicated channel state information reporting for a control channel, etc.). Information may be passed on to other components of the device. The receiver 710 may be an example of aspects of the transceiver 1035 described with reference to FIG. 10. The receiver 710 may utilize a single antenna or a set of antennas.

UE channel state manager 715 and/or at least some of its various sub-components may be implemented in hardware, software executed by a processor, firmware, or any combination thereof. If implemented in software executed by a processor, the functions of the UE channel state manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE channel state manager 715 and/or at least some of its various sub-components may be physically located at various positions, including being distributed such that portions of functions are implemented at different physical locations by one or more physical devices. In some examples, UE channel state manager 715 and/or at least some of its various sub-components may be a separate and distinct component in accordance with various aspects of the present disclosure. In other examples, UE channel state manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE channel state manager 715 may measure channel quality of a reference signal communicated (e.g., via a subband) via a control channel, determine a code rate for the control channel (e.g., for at least one subband of the control channel) based on the measured reference signal, generate feedback data for the control channel (e.g., for at least one subband of the control channel) based on the code rate, and transmit the feedback data.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
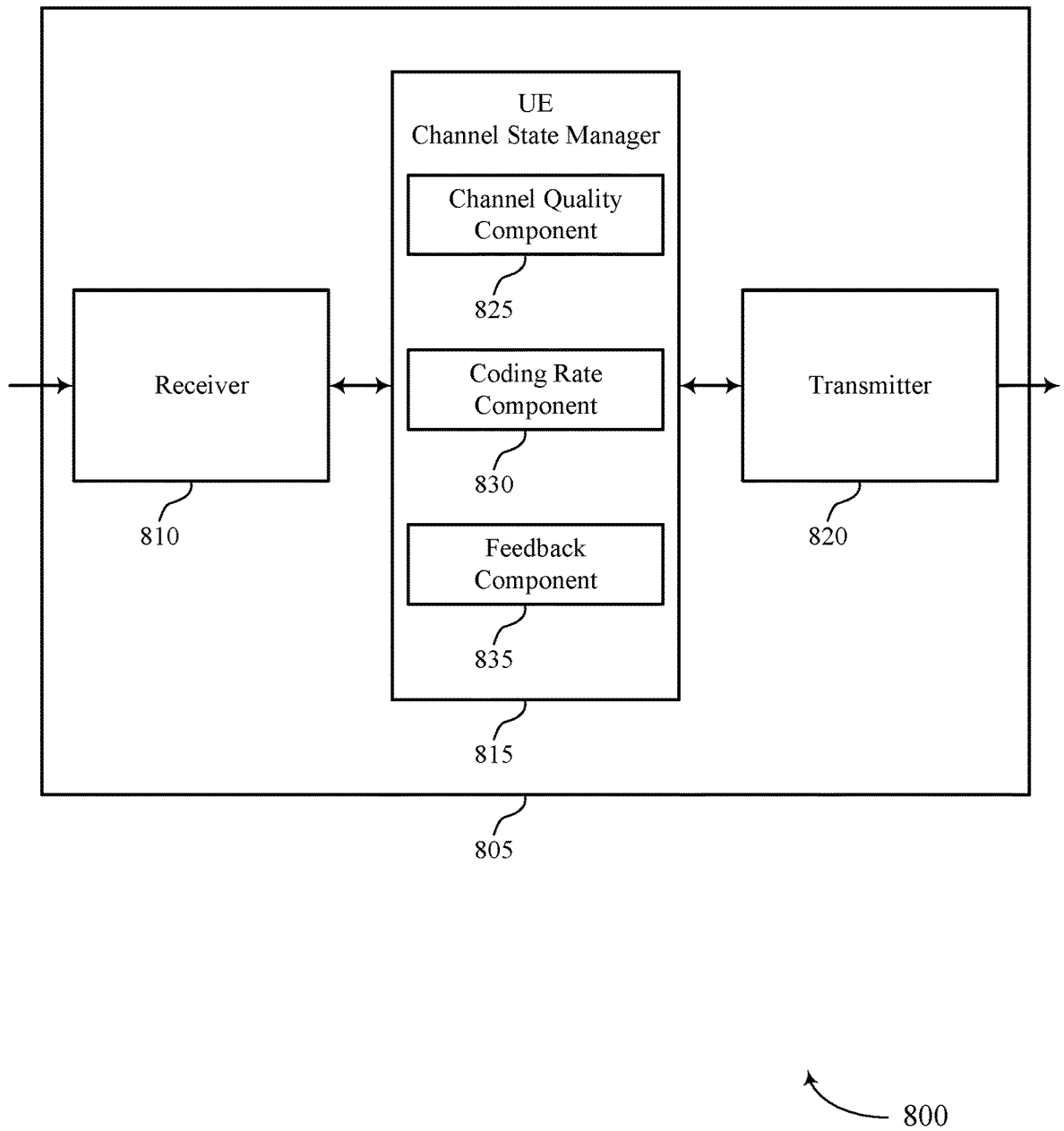

FIG. 8 shows a block diagram 800 of a wireless device 805 that supports dedicated channel state information reporting for a control channel in accordance with aspects of the present disclosure. Wireless device 805 may be an example of aspects of a wireless device 805 or a UE 115 as described with reference to FIG. 1. Wireless device 805 may include receiver 810, UE channel state manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to dedicated channel state information reporting for a control channel, etc.). Information may be passed on to other components of the device. The receiver 810 may be an example of aspects of the transceiver 1035 described with reference to FIG. 10. The receiver 810 may utilize a single antenna or a set of antennas.

UE channel state manager 815 may be an example of aspects of the UE channel state manager 715 described with reference to FIG. 7. UE channel state manager 815 may also include channel quality component 825, code rate component 830, and feedback component 835.

Channel quality component 825 may measure channel quality of a reference signal communicated (e.g., via a subband) via a control channel and determine at least one of CQI, a PMI, a PTI, or a RI, or a combination thereof. In some examples, the feedback data for the control channel (e.g., for at least one subband of the control channel) includes at least one of the CQI, the PMI, the PTI, or the RI, or a combination thereof. In some cases, the control channel is a sPDCCH.

Code rate component 830 may determine a code rate for the control channel (e.g., for at least one subband of the control channel) based on the measured reference signal, identify a payload size of a control information transmission and a metric of the control channel (e.g., of the subband of the control channel), determine a reliability parameter for the control channel. In some examples, code rate component 830 may determine the code rate for the control channel (e.g., for at least one subband of the control channel) is based on the identified payload size, the metric of the control channel (e.g., of at least one subband of the control channel), and the determined reliability parameter. Code rate component 830 may select a modulation scheme associated with the control information transmission. In some examples, code rate component 830 may determine the code rate for the control channel (e.g., for at least one subband of the control channel) based on the modulation scheme. In some cases, the modulation scheme includes at least one of QPSK or QAM. In some cases, code rate component 830 may determine the code rate for the control channel (e.g., for at least one subband of the control channel) based on a number of layers and a transmission mode for control information transmission. In some cases, the number of layers is a single layer and control information transmitted via the control channel (e.g., the subband of the control channel) is encoded using a SFBC. In some cases, sPDCCH transmission may be CRS-based or a DMRS-based. If CRS-based, the control information transmission may be coded using a SFBC and the channel quality feedback data reporting (e.g., CSI reporting) may be generated based on a received CRS. In some examples, the channel quality feedback data reporting may be a function of a number of CRS ports. In an example, in CRS-based modes, CRS may be used for multiple types of measurements (e.g., NZP-CSI-RS for channel measurement and IMR for interference measurement). If DMRS-based, the base station 205 may transmit the control information transmission using a single layer, and the UE 215 may define and use a single-port CSI-RS and interference measurement resource (IMR) to generate the channel quality feedback data. In some cases, code rate component 830 may determine the code rate for the control channel based on a transmission index.

Feedback component 835 may generate feedback data for the control channel (e.g., for at least one subband of the control channel) based on the code rate and transmit the feedback data. In some cases, feedback component 835 may identify an index from a set of indexes in a coding table for control information transmission corresponding to the determined code rate. In some examples, the feedback data includes the identified index. Feedback component 835 may determine an AL based on the identified payload size, the determined code rate, and the determined reliability parameter. In some examples, feedback component 835 may generate the feedback data based on the determined AL.

Feedback component 835 may determine to generate the feedback data for the control channel (e.g., for at least one subband of the control channel) based on identifying that decoding of information from a second subband was successful. Feedback component 835 may determine to generate the feedback data for the control channel (e.g., for at least one subband of the control channel) based on identifying that decoding of information from the subband was unsuccessful. In some cases, the feedback data includes at least one bit to indicate the determined AL. In some cases, the feedback data includes channel state information for the control channel (e.g., for at least one subband of the control channel), channel state information for a set of subbands that includes the subband, or wideband channel state information.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
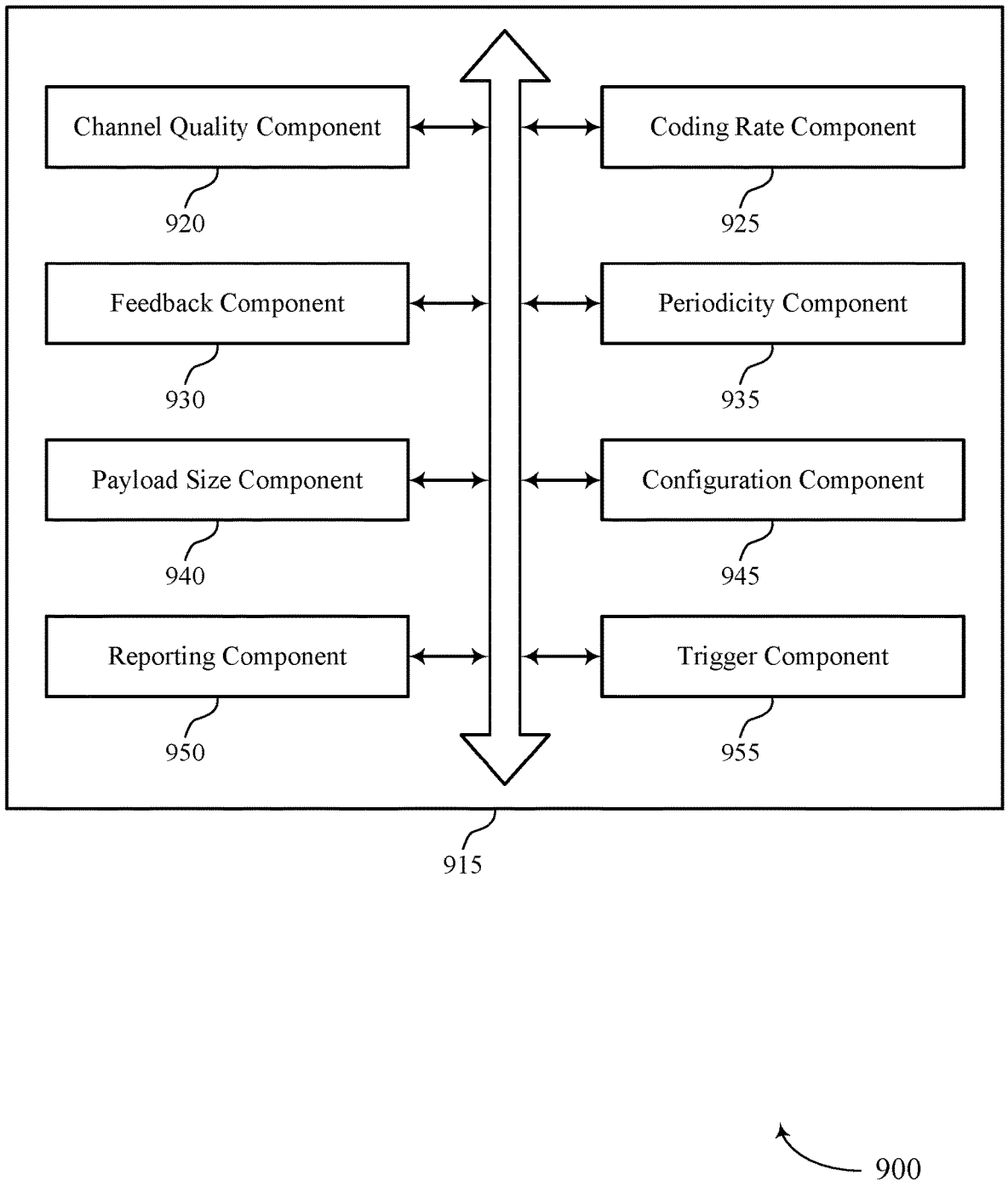

FIG. 9 shows a block diagram 900 of a UE channel state manager 915 that supports dedicated channel state information reporting for a control channel in accordance with aspects of the present disclosure. The UE channel state manager 915 may be an example of aspects of a UE channel state manager 715, a UE channel state manager 815, or a UE channel state manager 1015 described with reference to FIGS. 7, 8, and 10. The UE channel state manager 915 may include channel quality component 920, code rate component 925, feedback component 930, periodicity component 935, payload size component 940, configuration component 945, reporting component 950, and trigger component 955. Each of these modules may communicate, directly or indirectly, with one another (e.g., via one or more buses).

Channel quality component 920 may measure channel quality of a reference signal communicated (e.g., via a subband) via a control channel and determine at least one of a CQI, a PMI, a PTI, or a RI, or a combination thereof. In some examples, feedback data for the control channel (e.g., for at least one subband of the control channel) may include at least one of the CQI, the PMI, the PTI, or the RI, or a combination thereof. In some cases, the control channel is a sPDCCH. Code rate component 925 may determine a code rate for the control channel (e.g., for at least one subband of the control channel) based on the measured reference signal, identify a payload size of a control information transmission and a metric of the control channel (e.g., of the subband of the control channel), and determine a reliability parameter for the control channel.

Code rate component 925 may determine the code rate for the control channel (e.g., for at least one subband of the control channel) based on the identified payload size, the metric of the control channel (e.g., of the subband of the control channel), and the determined reliability parameter, and select a modulation scheme associated with the control information transmission. In some examples, code rate component 925 may determine the code rate for the control channel (e.g., for at least one subband of the control channel) based on the modulation scheme. In some cases, the modulation scheme includes at least one of QPSK or QAM. In some cases, code rate component 925 may determine the code rate for the control channel (e.g., for at least one subband of the control channel) based on a number of layers and a transmission mode for control information transmission. In some cases, the number of layers is a single layer and control information transmitted via the control channel (e.g., of the subband of the control channel) is encoded using a SFBC. In some cases, the code rate component 925 may determine the code rate for the control channel based on a transmission index.

Feedback component 930 may generate feedback data for the control channel (e.g., for at least one subband of the control channel) based on the code rate and transmit the feedback data. In some cases, feedback component 930 may identify an index from a set of indexes in a coding table for control information transmission corresponding to the determined code rate. The feedback data may include the identified index. Feedback component 930 may determine an AL based on the identified payload size, the determined code rate, and the determined reliability parameter. In some cases, feedback component 930 may generate the feedback data based on the determined AL.

Feedback component 930 may determine to generate the feedback data for the control channel (e.g., for at least one subband of the control channel) based on identifying that decoding of information from a second subband was successful or determine to generate the feedback data for the control channel (e.g., for at least one subband of the control channel) based on identifying that decoding of information from the control channel (e.g., of at least one subband of the control channel) was unsuccessful. In some cases, the feedback data includes at least one bit to indicate the determined AL. In some cases, the feedback data includes channel state information for the control channel (e.g., for at least one subband of the control channel), channel state information for a set of subbands that includes the subband, or wideband channel state information.

Periodicity component 935 may identify a periodicity for transmitting the reference signal that may be based on a duration of a mini-slot or a sTTI. Payload size component 940 may determine a payload size for each of a set of DCI formats, determine a set of code rates for the control channel (e.g., for at least one subband of the control channel) based on the determined payload sizes, and determine a set of aggregation levels based on the set of code rates. In some cases, each of the set of aggregation levels corresponds to a payload size of a set of different payload sizes. In some cases, the feedback data includes a mapping of each of the determined code rates to a respective payload size of a set of different payload sizes. In some cases, the feedback data includes a mapping of each of the determined aggregation levels to a respective payload size of the set of different payload sizes.

Configuration component 945 may receive, from a base station, configuration information instructing the UE channel state manager 915 to perform a measurement on a number of subbands associated with one or more component carriers and select to measure on one or more subbands of the number of subbands based on a UE configuration.

Reporting component 950 may identify a duration of a reporting timeline. In some cases, a duration of a reporting timeline associated with transmitting the feedback data is based on a number of subband measurements, or a measurement type, or a number of payload sizes for control information, or any combination thereof. In some examples, reporting component 950 may determine a number of possible re-transmissions within a latency window based at least in part on the determined payload size, the selected code rate, or both. In some cases, a duration of a reporting timeline associated with transmitting the feedback data is based on whether decoding of information from a second subband was successful. In some cases, a duration of a reporting timeline associated with transmitting the feedback data is based on a number of possible re-transmissions within a latency window. Reporting component 950 may transmit an indicator of a reporting timeline associated with transmitting the feedback data based at least in part on the number of possible re-transmissions.

Trigger component 955 may receive, from a base station, a feedback trigger instructing the UE to separately or jointly provide the feedback data. In some cases, the feedback trigger includes at least one bit. Trigger component 955 may transmit the feedback data for the control channel separately or jointly with reporting second feedback data for a data channel. In some examples, the feedback data for the control channel may be reported jointly with reporting of second feedback data for the data channel based at least in part on reporting of the feedback data for the control channel colliding with reporting of the second feedback data for the data channel. In some cases, the feedback data for the control channel may be reported separately from reporting of second feedback data for the data channel based at least in part on reporting of the feedback data for the control channel not colliding with reporting of the second feedback data for the data channel. Trigger component 955 may also receive a configuration signaling indicating whether to separately or jointly report the feedback data for the control channel and second feedback data for the data channel.

Figure 10:
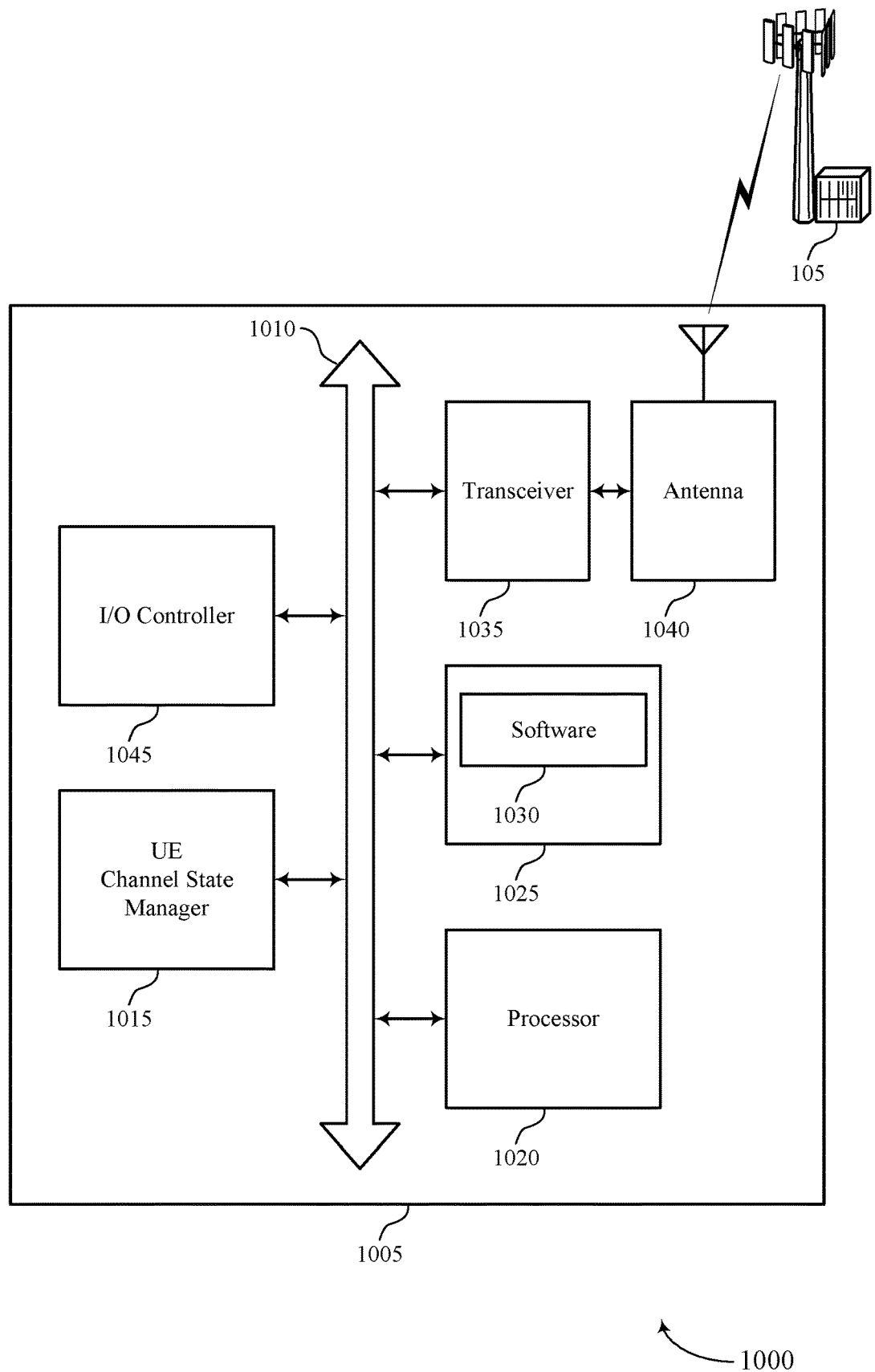
FIG. 10 illustrates a block diagram of a system including a UE that supports dedicated channel state information reporting for a control channel in accordance with aspects of the present disclosure.

FIG. 10 shows a diagram of a system 1000 including a device 1005 that supports dedicated channel state information reporting for a control channel in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE channel state manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting dedicated channel state information reporting for a control channel).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support dedicated channel state information reporting for a control channel. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
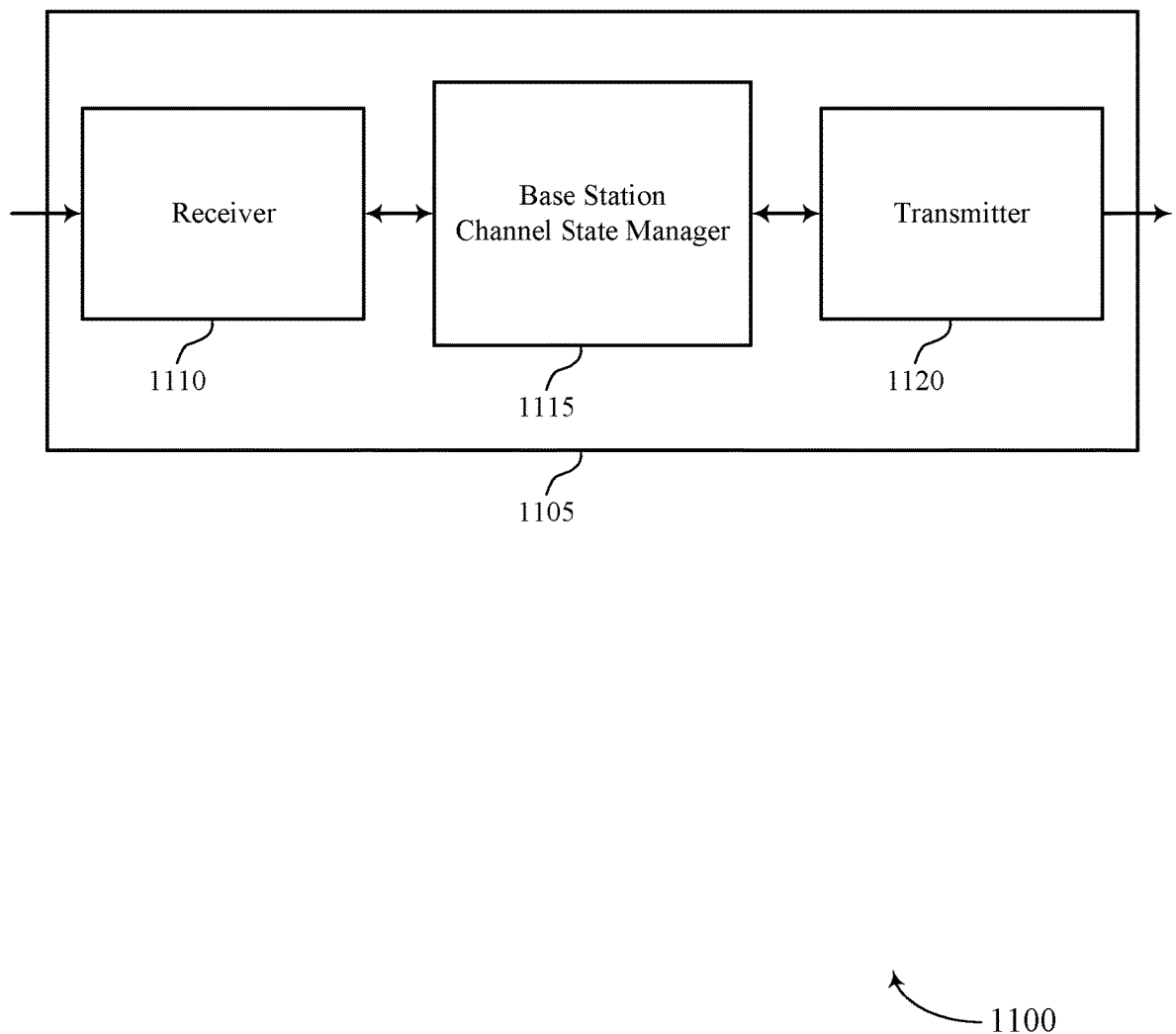
FIGS. 11 through 13 show block diagrams of a device that supports dedicated channel state information reporting for a control channel in accordance with aspects of the present disclosure.

FIG. 11 shows a block diagram 1100 of a wireless device 1105 that supports dedicated channel state information reporting for a control channel in accordance with aspects of the present disclosure. Wireless device 1105 may be an example of aspects of a base station 105 as described herein. Wireless device 1105 may include receiver 1110, base station channel state manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to dedicated channel state information reporting for a control channel, etc.). Information may be passed on to other components of the device. The receiver 1110 may be an example of aspects of the transceiver 1435 described with reference to FIG. 14. The receiver 1110 may utilize a single antenna or a set of antennas.

Base station channel state manager 1115 and/or at least some of its various sub-components may be implemented in hardware, software executed by a processor, firmware, or any combination thereof. If implemented in software executed by a processor, the functions of the base station channel state manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station channel state manager 1115 and/or at least some of its various sub-components may be physically located at various positions, including being distributed such that portions of functions are implemented at different physical locations by one or more physical devices. In some examples, base station channel state manager 1115 and/or at least some of its various sub-components may be a separate and distinct component in accordance with various aspects of the present disclosure. In other examples, base station channel state manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas. Transmitter 1120 may transmit a reference signal in a control channel (e.g., the subband of the control channel), transmit a control channel transmission in the control channel (e.g., the subband of the control channel) using a modulation and coding scheme selected based on the feedback data, and transmit the data encoded using the second code rate via the control channel (e.g., the subband of the control channel). Base station channel state manager 1115 may receive channel quality feedback data for the control channel (e.g., for at least one subband of the control channel) in response to the reference signal.

Figure 12:
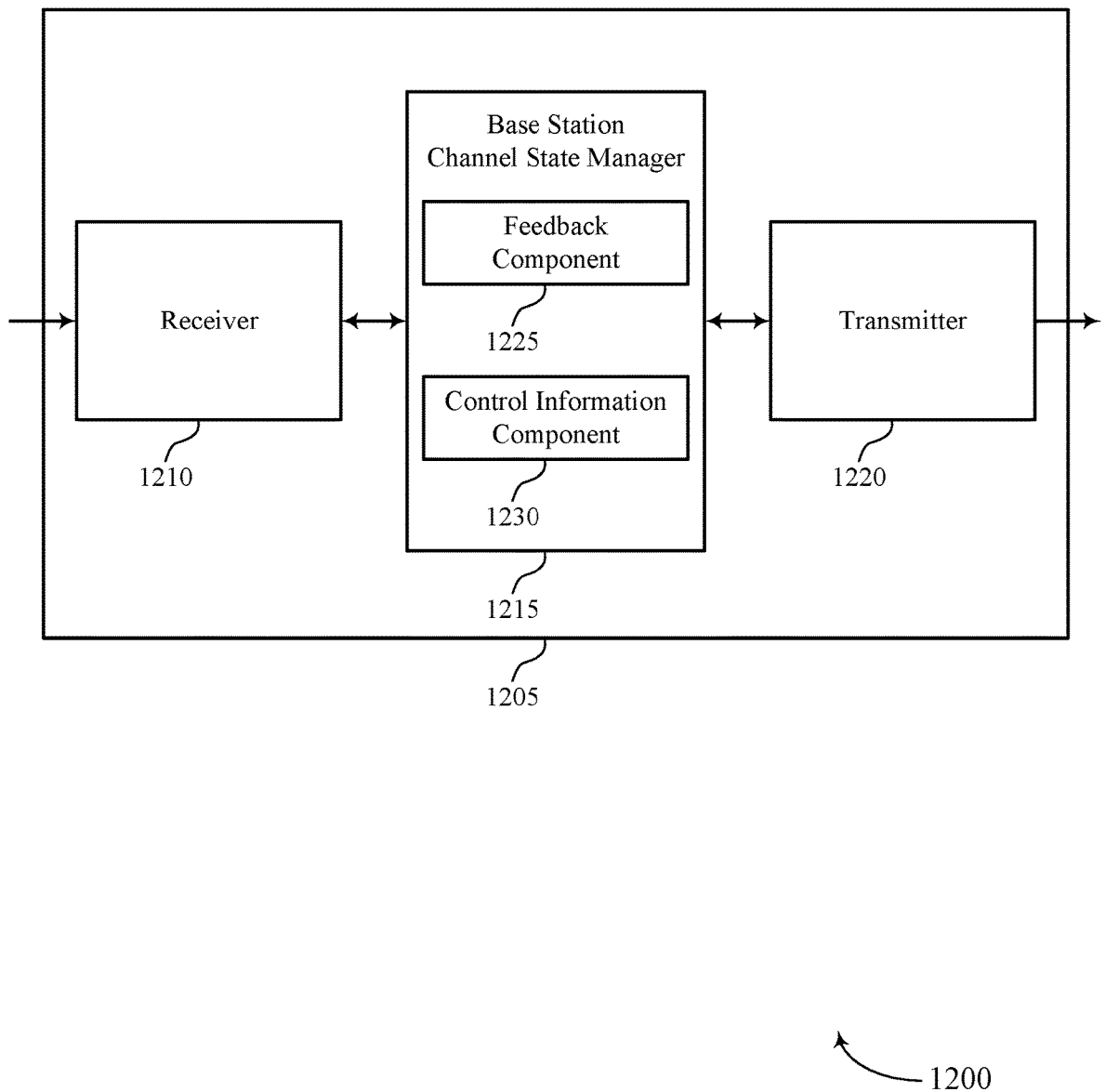

FIG. 12 shows a block diagram 1200 of a wireless device 1205 that supports dedicated channel state information reporting for a control channel in accordance with aspects of the present disclosure. Wireless device 1205 may be an example of aspects of a wireless device 1105 or a base station 105 as described with reference to FIG. 11. Wireless device 1205 may include receiver 1210, base station channel state manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to dedicated channel state information reporting for a control channel, etc.). Information may be passed on to other components of the device. The receiver 1210 may be an example of aspects of the transceiver 1435 described with reference to FIG. 14. The receiver 1210 may utilize a single antenna or a set of antennas.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Base station channel state manager 1215 may be an example of aspects of the base station channel state manager 1115 described with reference to FIG. 11. Base station channel state manager 1215 may also include feedback component 1225 and control information component 1230. Feedback component 1225 may receive channel quality feedback data for the control channel (e.g., for at least one subband of the control channel) in response to the reference signal and determine that the feedback data includes a negative acknowledgment for data transmitted via the control channel (e.g., at least one subband of the control channel), the data encoding using a first code rate. Control information component 1230 select a modulation and coding scheme based on the feedback data for a control channel transmission in the control channel (e.g., the subband of the control channel).

Figure 13:
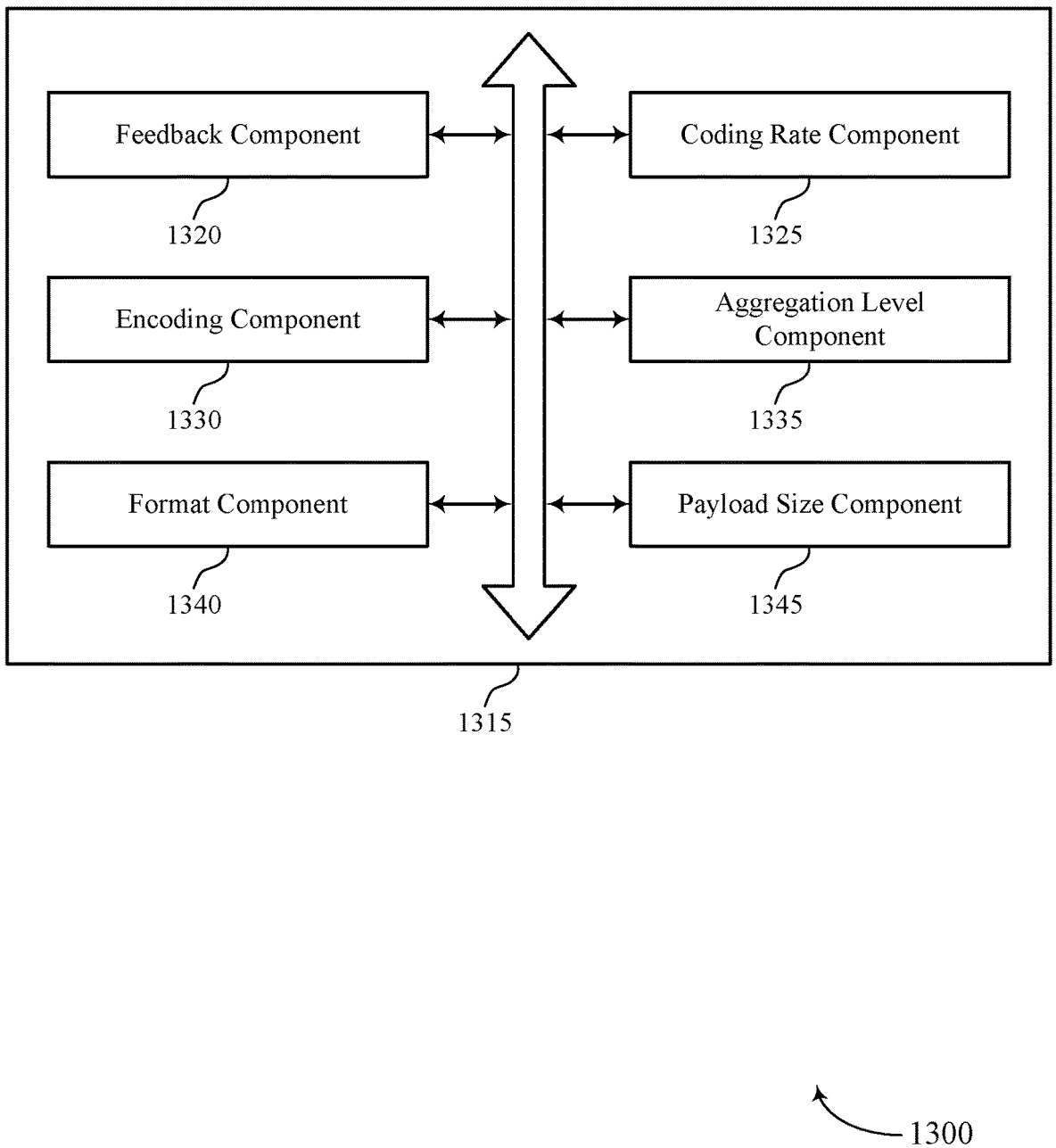

FIG. 13 shows a block diagram 1300 of a base station channel state manager 1315 that supports dedicated channel state information reporting for a control channel in accordance with aspects of the present disclosure. The base station channel state manager 1315 may be an example of aspects of a base station channel state manager 1415 described with reference to FIGS. 11, 12, and 14. The base station channel state manager 1315 may include feedback component 1320, code rate component 1325, encoding component 1330, aggregation level component 1335, format component 1340, and payload size component 1345. Each of these modules may communicate, directly or indirectly, with one another (e.g., via one or more buses).

Feedback component 1320 may receive channel quality feedback data for the control channel (e.g., at least one subband of the control channel) in response to the reference signal and determine that the feedback data includes a negative acknowledgment for data transmitted via the control channel (e.g., the subband of the control channel), the data encoding using a first code rate. Code rate component 1325 may determine a code rate index from a set of indexes in a coding table based on the feedback data and select a code rate for the control information based on the determined payload size and the feedback data.

Encoding component 1330 may encode control information based on a code rate corresponding to the code rate index. In some cases, the control channel transmission is generated based on the encoded control information. Encoding component 1330 may encode control information based on the determined aggregation level. In some cases, the control channel transmission is generated based on the encoded control information. Encoding component 1330 may encode the data using a second code rate that differs from the first code rate and encode the control information based on the selected code rate, where the control channel transmission is generated based on the encoded control information.

Aggregation level component 1335 may determine an aggregation level from a set of aggregation levels based on the feedback data. Format component 1340 may select a format for control information. Payload size component 1345 may determine a payload size of the selected format.

Figure 14:
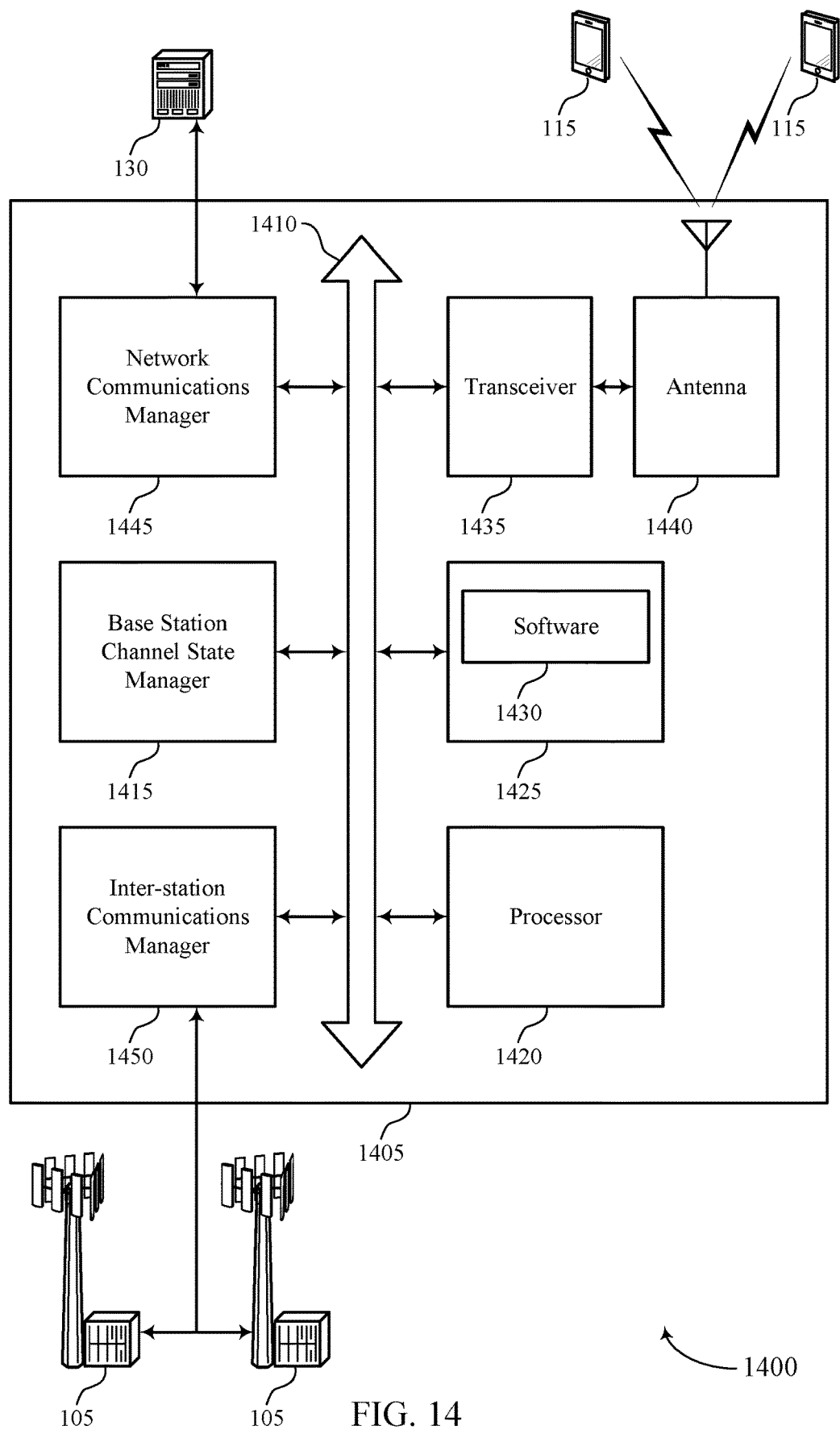
FIG. 14 illustrates a block diagram of a system including a base station that supports dedicated channel state information reporting for a control channel in accordance with aspects of the present disclosure.

FIG. 14 shows a diagram of a system 1400 including a device 1405 that supports dedicated channel state information reporting for a control channel in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station channel state manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting dedicated channel state information reporting for a control channel).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support dedicated channel state information reporting for a control channel. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105 and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
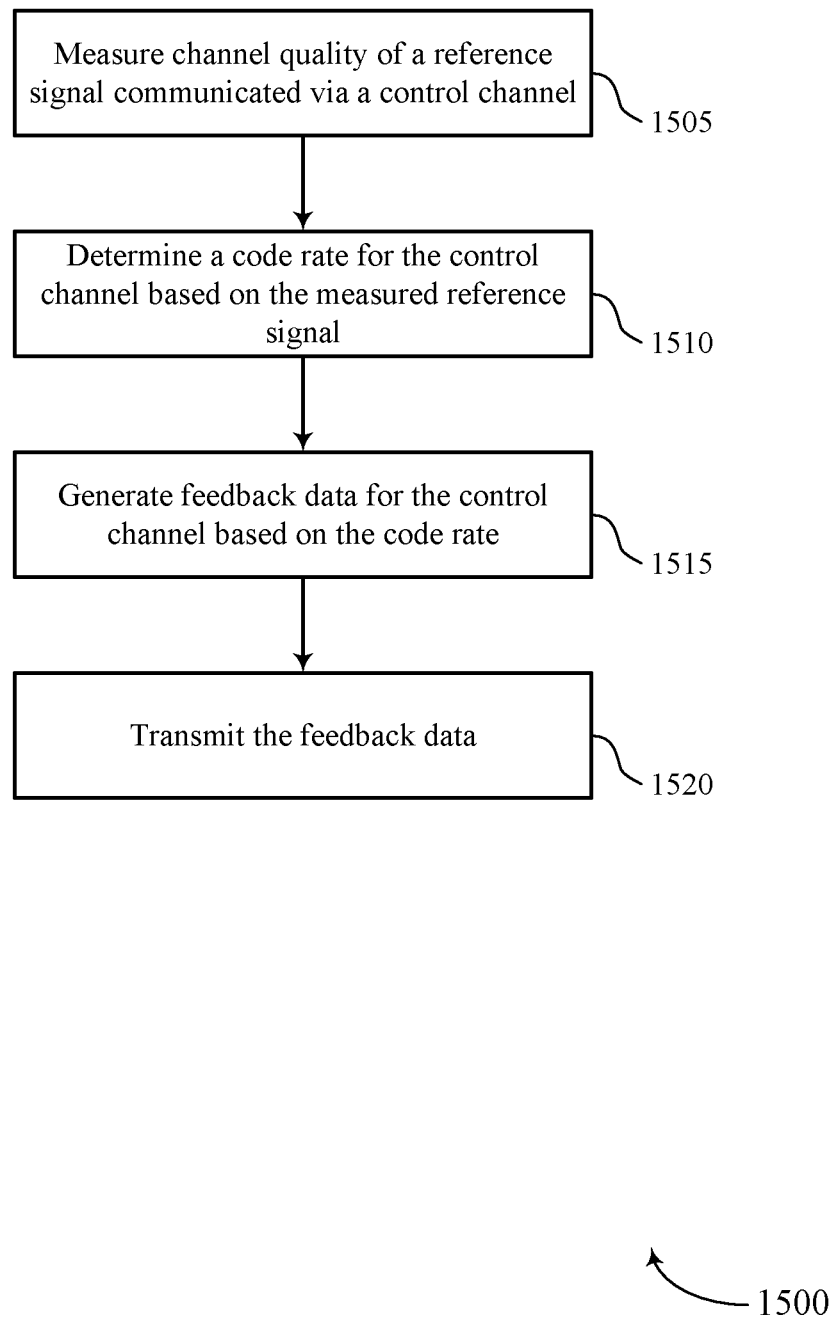
FIGS. 15 through 20 illustrate methods for dedicated channel state information reporting for a control channel in accordance with aspects of the present disclosure.

FIG. 15 shows a flowchart illustrating a method 1500 for dedicated channel state information reporting for a control channel in accordance with aspects of the present disclosure. The operations of method 1500 may be implemented by a UE 115 or its components as described herein. For example, the operations of method 1500 may be performed by a UE channel state manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may measure channel quality of a reference signal communicated via a control channel. In some examples, the reference signal may be communicated (e.g., via a subband) via a control channel. The operations of block 1505 may be performed according to the methods described herein. In certain examples, aspects of the operations of block 1505 may be performed by a channel quality component as described with reference to FIGS. 7 through 10.

At block 1510 the UE 115 may determine a code rate for the control channel on the measured reference signal. In some cases, the determined code rate may be for a subband of the control channel. The operations of block 1510 may be performed according to the methods described herein. In certain examples, aspects of the operations of block 1510 may be performed by a code rate component as described with reference to FIGS. 7 through 10.

At block 1515 the UE 115 may generate feedback data for the control channel based on the code rate. In some cases, the feedback data may be for a subband of the control channel. The operations of block 1515 may be performed according to the methods described herein. In certain examples, aspects of the operations of block 1515 may be performed by a feedback component as described with reference to FIGS. 7 through 10.

At block 1520 the UE 115 may transmit the feedback data. The operations of block 1520 may be performed according to the methods described herein. In certain examples, aspects of the operations of block 1520 may be performed by a feedback component as described with reference to FIGS. 7 through 10.

Figure 16:
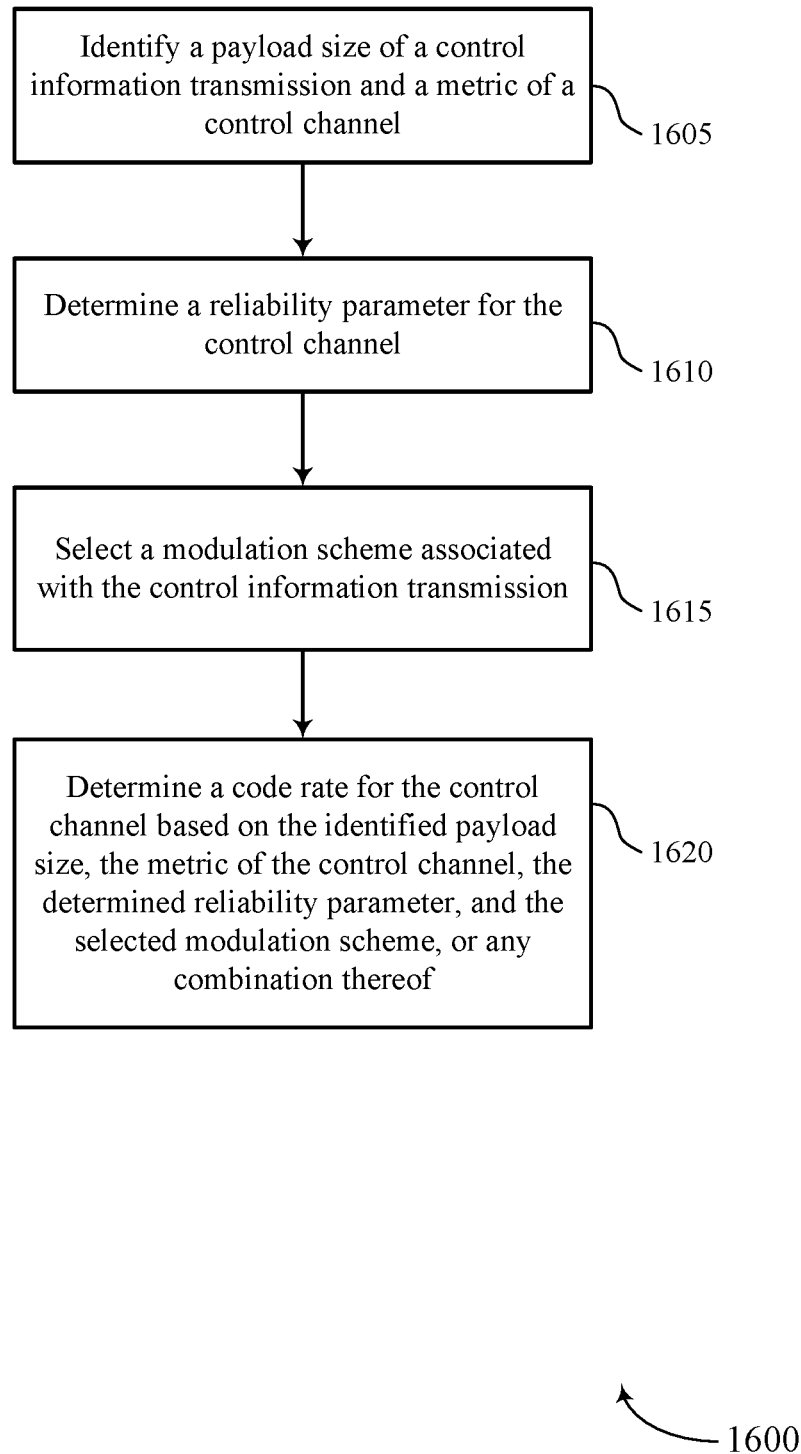

FIG. 16 shows a flowchart illustrating a method 1600 for dedicated channel state information reporting for a control channel in accordance with aspects of the present disclosure. The operations of method 1600 may be implemented by a UE 115 or its components as described herein. For example, the operations of method 1600 may be performed by a UE channel state manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a payload size of a control information transmission and a metric of a control channel. In some cases, the metric may be of a subband of the control channel. The operations of block 1605 may be performed according to the methods described herein. In certain examples, aspects of the operations of block 1605 may be performed by a code rate component as described with reference to FIGS. 7 through 10.

At block 1610 the UE 115 may determine a reliability parameter for the control channel. The operations of block 1610 may be performed according to the methods described herein. In certain examples, aspects of the operations of block 1610 may be performed by a code rate component as described with reference to FIGS. 7 through 10.

At block 1615 the UE 115 may select a modulation scheme associated with the control information transmission. The operations of block 1615 may be performed according to the methods described herein. In certain examples, aspects of the operations of block 1615 may be performed by a code rate component as described with reference to FIGS. 7 through 10.

At block 1620 the UE 115 may determine a code rate for the control channel based on the identified payload size, the metric of the control channel, the determined reliability parameter, and the selected modulation scheme, or any combination thereof. In some cases, the determined code rate may be for a subband of the control channel. The operations of block 1620 may be performed according to the methods described herein. In certain examples, aspects of the operations of block 1620 may be performed by a code rate component as described with reference to FIGS. 7 through 10.

Figure 17:
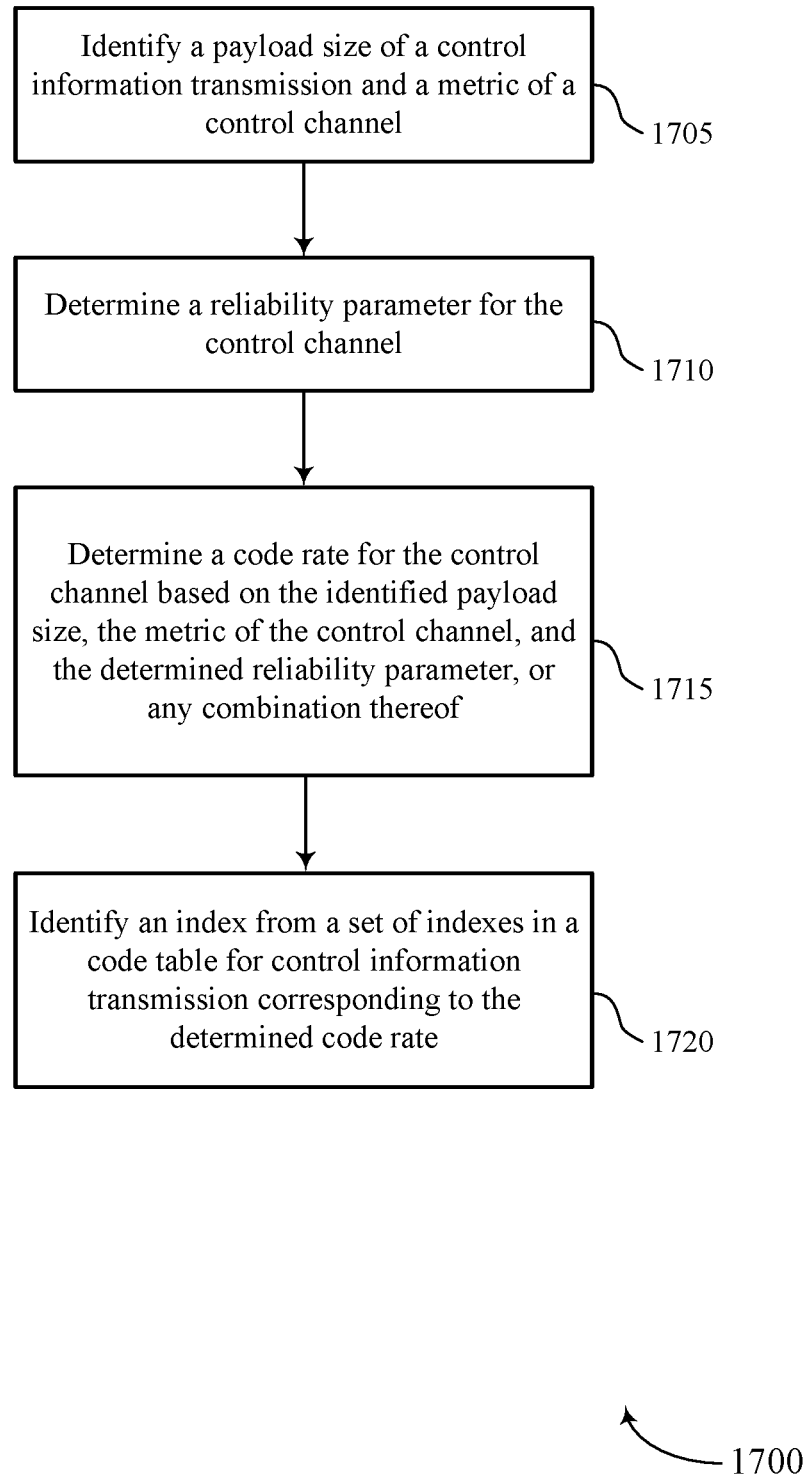

FIG. 17 shows a flowchart illustrating a method 1700 for dedicated channel state information reporting for a control channel in accordance with aspects of the present disclosure. The operations of method 1700 may be implemented by a UE 115 or its components as described herein. For example, the operations of method 1700 may be performed by a UE channel state manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a payload size of a control information transmission and a metric of a control channel. In some cases, the metric may be of a subband of the control channel. The operations of block 1705 may be performed according to the methods described herein. In certain examples, aspects of the operations of block 1705 may be performed by a code rate component as described with reference to FIGS. 7 through 10.

At block 1710 the UE 115 may determine a reliability parameter for the control channel. The operations of block 1710 may be performed according to the methods described herein. In certain examples, aspects of the operations of block 1710 may be performed by a code rate component as described with reference to FIGS. 7 through 10.

At block 1715 the UE 115 may determine a code rate for the control channel based on the identified payload size, the metric of the control channel, and the determined reliability parameter, or any combination thereof. In some cases, the determined code rate may be for a subband of the control channel. The operations of block 1715 may be performed according to the methods described herein. In certain examples, aspects of the operations of block 1715 may be performed by a code rate component as described with reference to FIGS. 7 through 10.

At block 1720 the UE 115 may identify an index from a set of indexes in a coding table for control information transmission corresponding to the determined code rate. In some cases, UE 115 may transmit feedback data including the identified index. The operations of block 1720 may be performed according to the methods described herein. In certain examples, aspects of the operations of block 1720 may be performed by a feedback component as described with reference to FIGS. 8 through 10.

Figure 18:
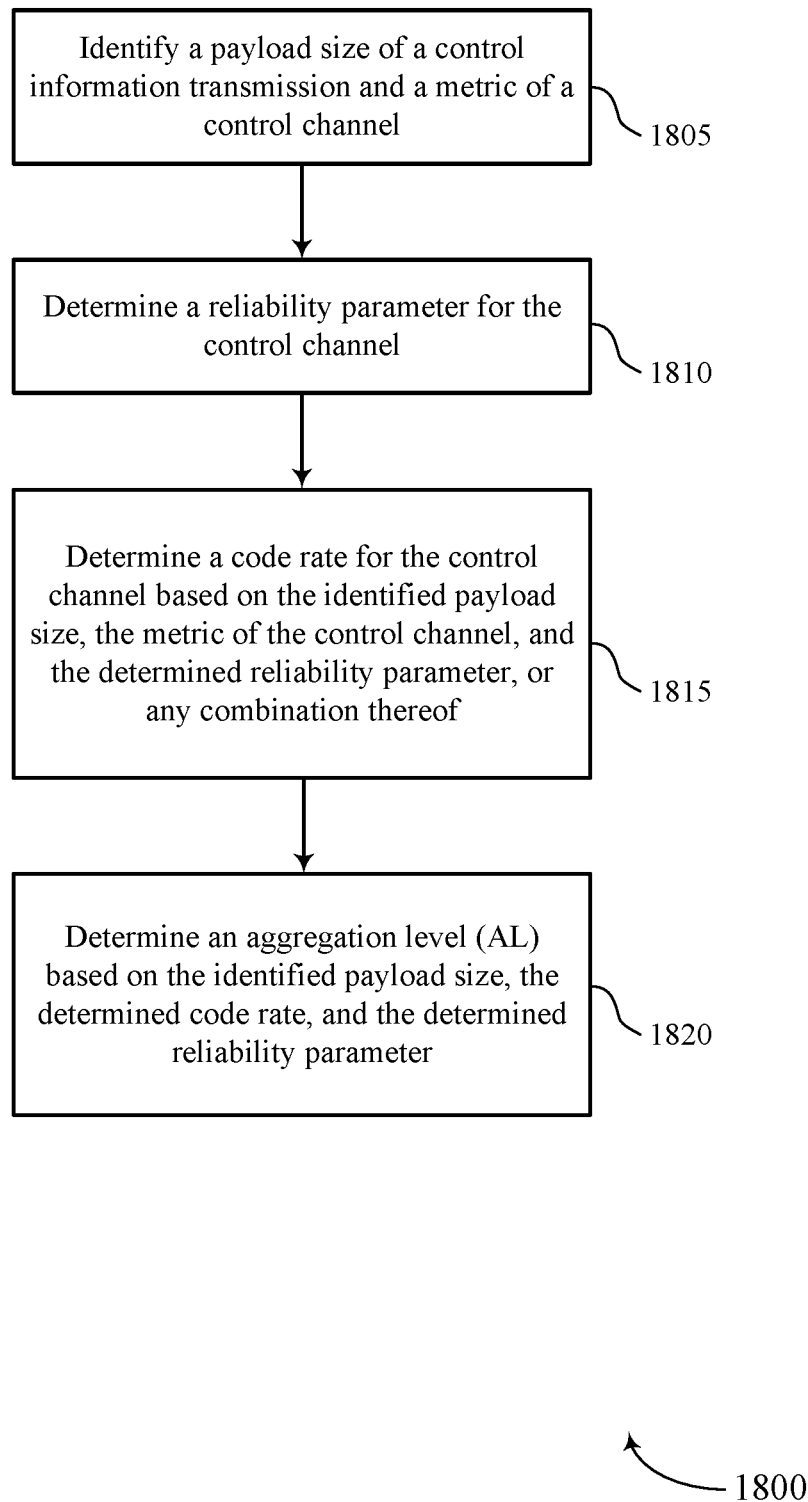

FIG. 18 shows a flowchart illustrating a method 1800 for dedicated channel state information reporting for a control channel in accordance with aspects of the present disclosure. The operations of method 1800 may be implemented by a UE 115 or its components as described herein. For example, the operations of method 1800 may be performed by a UE channel state manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify a payload size of a control information transmission and a metric of a control channel. In some cases, the metric may be of a subband of the control channel. The operations of block 1805 may be performed according to the methods described herein. In certain examples, aspects of the operations of block 1805 may be performed by a code rate component as described with reference to FIGS. 7 through 10.

At block 1810 the UE 115 may determine a reliability parameter for the control channel. The operations of block 1810 may be performed according to the methods described herein. In certain examples, aspects of the operations of block 1810 may be performed by a code rate component as described with reference to FIGS. 7 through 10.

At block 1815 the UE 115 may determine a code rate for the control channel based on the identified payload size, the metric of the control channel, and the determined reliability parameter, or any combination thereof. In some cases, the determined code rate may be for a subband of the control channel. The operations of block 1815 may be performed according to the methods described herein. In certain examples, aspects of the operations of block 1815 may be performed by a code rate component as described with reference to FIGS. 7 through 10.

At block 1820 the UE 115 may determine an AL based on the identified payload size, the determined code rate, and the determined reliability parameter. In some cases, UE 115 may generate feedback data based on the determined AL. The operations of block 1820 may be performed according to the methods described herein. In certain examples, aspects of the operations of block 1820 may be performed by a feedback component as described with reference to FIGS. 7 through 10.

Figure 19:
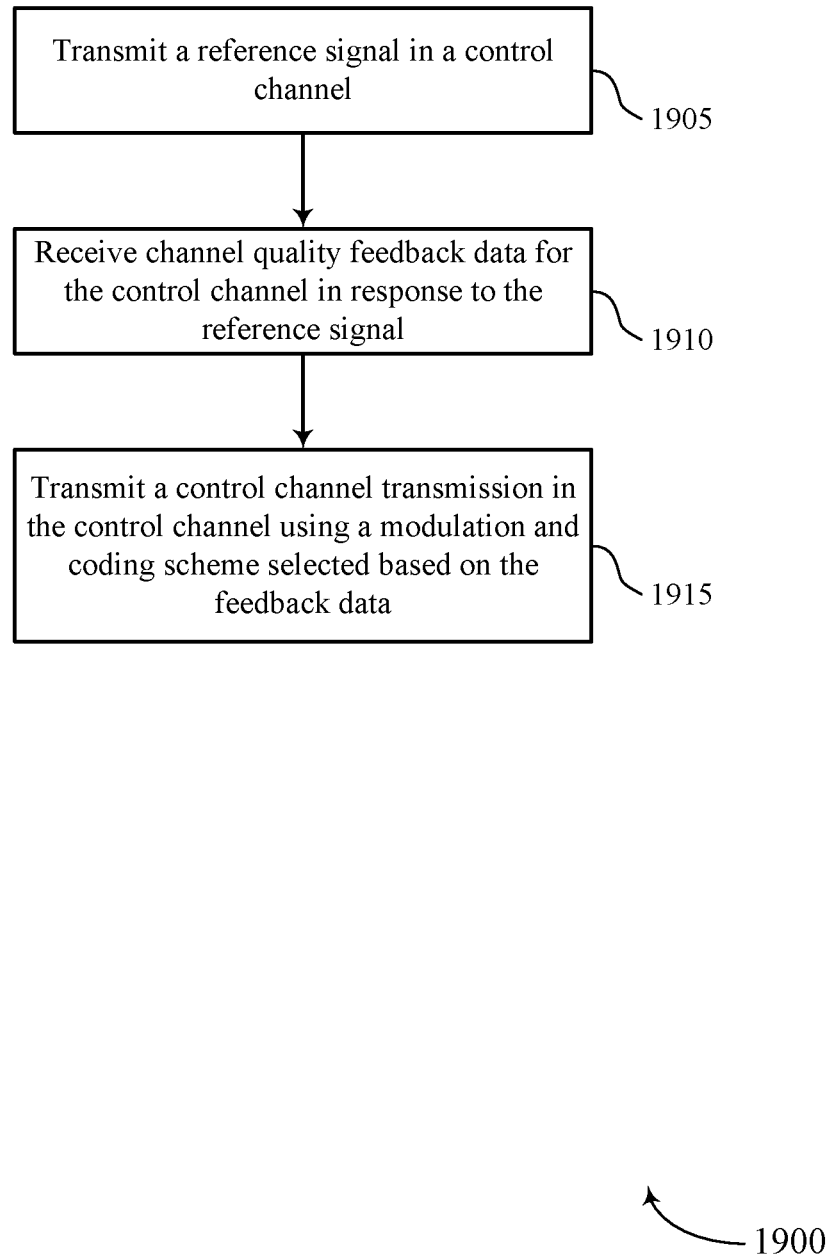

FIG. 19 shows a flowchart illustrating a method 1900 for dedicated channel state information reporting for a control channel in accordance with aspects of the present disclosure. The operations of method 1900 may be implemented by a base station 105 or its components as described herein. For example, the operations of method 1900 may be performed by a base station channel state manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may transmit a reference signal in a control channel. In some examples, the reference signal may be transmitted in at least one subband of the control channel. In some cases, the reference signal may be wideband (e.g., CRS, CSI-RS) and the UE 115 may compute CSI for one or more subbands. The operations of block 1905 may be performed according to the methods described herein. In certain examples, aspects of the operations of block 1905 may be performed by a transmitter as described with reference to FIGS. 11 through 14.

At block 1910 the base station 105 may receive channel quality feedback data for the control channel in response to the reference signal. In some examples, the channel quality feedback data may be for a subband of the control channel. The operations of block 1910 may be performed according to the methods described herein. In certain examples, aspects of the operations of block 1910 may be performed by a feedback component as described with reference to FIGS. 11 through 14.

At block 1915 the base station 105 may transmit a control channel transmission in the control channel using a modulation and coding scheme selected based on the feedback data. In some cases, the control channel transmission may be transmitted in a subband of the control channel. The operations of block 1915 may be performed according to the methods described herein. In certain examples, aspects of the operations of block 1915 may be performed by a transmitter as described with reference to FIGS. 11 through 14.

Figure 20:
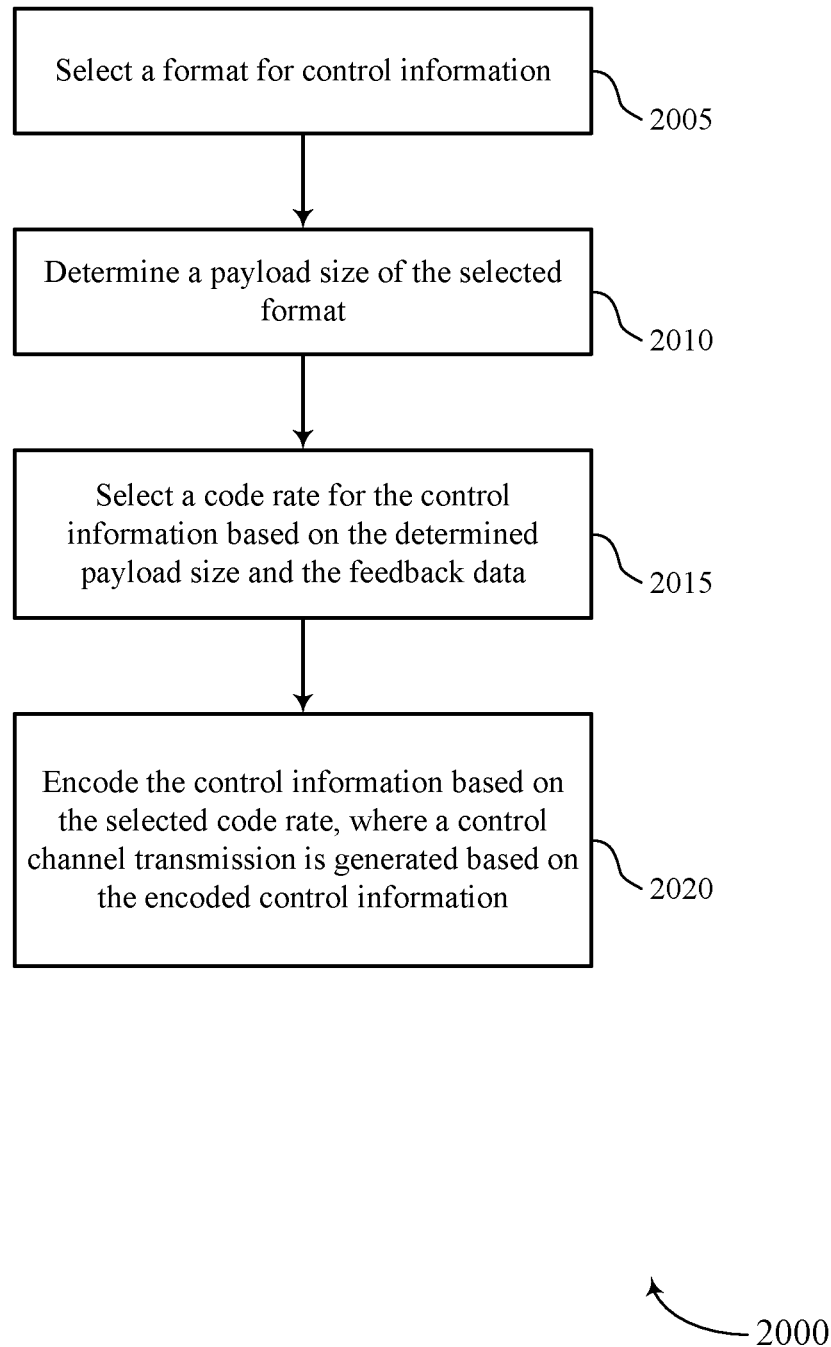

FIG. 20 shows a flowchart illustrating a method 2000 for dedicated channel state information reporting for a control channel in accordance with aspects of the present disclosure. The operations of method 2000 may be implemented by a base station 105 or its components as described herein. For example, the operations of method 2000 may be performed by a base station channel state manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may select a format for control information. The operations of block 2005 may be performed according to the methods described herein. In certain examples, aspects of the operations of block 2005 may be performed by a format component as described with reference to FIGS. 11 through 14.

At block 2010 the base station 105 may determine a payload size of the selected format. The operations of block 2010 may be performed according to the methods described herein. In certain examples, aspects of the operations of block 2010 may be performed by a payload size component as described with reference to FIGS. 11 through 14.

At block 2015 the base station 105 may select a code rate for the control information based on the determined payload size and the feedback data. The operations of block 2015 may be performed according to the methods described herein. In certain examples, aspects of the operations of block 2015 may be performed by a code rate component as described with reference to FIGS. 11 through 14.

At block 2020 the base station 105 may encode the control information based on the selected code rate, wherein the control channel transmission is generated based on the encoded control information. The operations of block 2020 may be performed according to the methods described herein. In certain examples, aspects of the operations of block 2020 may be performed by an encoding component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein-including, for example, system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) read only memory (ROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    measuring channel quality of a reference signal communicated via a control channel;
    determining a code rate for the control channel based at least in part on the measured reference signal and a transmission index indicating retransmission;
    generating feedback data for the control channel that indicates the code rate;
    transmitting the feedback data for the control channel to a base station; and
    receiving, via the control channel, a control transmission that includes control information encoded using the code rate.

2. The method of claim 1, further comprising:
    determining at least one of a channel quality indicator (CQI), a pre-coding matrix indicator (PMI), a precoding type indicator (PTI), or a rank indicator (RI), or a combination thereof,
    wherein the feedback data for the control channel comprises at least one of the CQI, the PMI, the PTI, or the RI, or a combination thereof.

3. The method of claim 1, further comprising:
identifying a payload size of a control information transmission and a metric of the control channel; and
determining a reliability parameter for the control channel, wherein determining the code rate for the control channel is based at least in part on the identified payload size, the metric of the control channel, and the determined reliability parameter.

4. The method of claim 3, further comprising:
selecting a modulation scheme associated with the control information transmission, wherein determining the code rate for the control channel is based at least in part on the modulation scheme.

5. The method of claim 3, further comprising:
identifying an index from a set of indexes in a code rate index table for the control information transmission corresponding to the determined code rate, wherein the feedback data comprises the identified index.

6. The method of claim 3, further comprising:
determining an aggregation level (AL) based at least in part on the identified payload size, the determined code rate, and the determined reliability parameter,
wherein generating the feedback data is based at least in part on the determined AL.

7. The method of claim 6, wherein the feedback data comprises at least one bit to indicate the determined AL.

8. The method of claim 1, wherein determining the code rate for the control channel is based at least in part on a modulation scheme.

9. The method of claim 8, wherein the modulation scheme comprises at least one of quadrature phase shift keying (QPSK) or quadrature amplitude modulation (QAM).

10. The method of claim 1, wherein determining the code rate for the control channel is based at least in part on a number of layers and a transmission mode for control information transmission.

11. The method of claim 10, wherein the transmission mode is one of a common reference signal (CRS)-based transmission mode or a demodulation reference signal (DMRS)-based transmission mode.

12. The method of claim 1, wherein a periodicity for transmitting the reference signal is based at least in part on a duration of a mini-slot or a shortened transmission time interval (sTTI).

13. The method of claim 1, further comprising:
determining a payload size for each of a plurality of downlink control information (DCI) formats; and
determining a plurality of code rates for the control channel based at least in part on the determined payload sizes.

14. The method of claim 13, wherein the feedback data comprises a mapping of each of the determined code rates to a respective payload size of a plurality of different payload sizes.

15. The method of claim 13, further comprising:
determining a plurality of aggregation levels based at least in part on the plurality of code rates, wherein each of the plurality of aggregation levels corresponds to a payload size of a plurality of different payload sizes.

16. The method of claim 15, wherein the feedback data comprises a mapping of each of the determined aggregation levels to a respective payload size of the plurality of different payload sizes.

17. The method of claim 1, further comprising:
receiving, from a base station, configuration information instructing the UE to perform a measurement on a number of subbands associated with one or more component carriers.

18. The method of claim 17, further comprising:
selecting to measure on one or more subbands of the number of subbands based at least in part on a UE configuration.

19. The method of claim 1, wherein the feedback data comprises channel state information for a subband of the control channel, channel state information for a set of subbands that includes the subband, or wideband channel state information.

20. The method of claim 1, wherein determining the code rate for the control channel further comprises:
determining a second code rate for the control channel; and
adjusting the second code rate to the code rate based at least in part on the transmission index indicating retransmission.

21. The method of claim 19, further comprising:
determining to generate the feedback data for the control channel based at least in part on identifying that decoding of information from a second subband was successful.

22. The method of claim 1, further comprising:
determining to generate the feedback data for the control channel based at least in part on identifying that decoding of information from the control channel was unsuccessful.

23. The method of claim 1, wherein a reporting timeline associated with transmitting the feedback data is based at least in part on a number of subband measurements, or a measurement type, or a number of payload sizes for control information, or any combination thereof.

24. The method of claim 19, wherein a reporting timeline associated with transmitting the feedback data is based at least in part on whether decoding of information from a second subband was successful.

25. The method of claim 1, further comprising:
receiving an indicator of a reporting timeline associated with transmitting the feedback data, wherein the reporting timeline is based at least in part on a number of possible re-transmissions within a latency window.

26. The method of claim 1, wherein the control channel is a shortened physical downlink control channel (sPDCCH).

27. The method of claim 1, further comprising:
receiving, from a base station, a feedback trigger instructing the UE to separately or jointly provide the feedback data.

28. The method of claim 27, wherein the feedback trigger comprises at least one bit.

29. The method of claim 1, wherein transmitting the feedback data comprises:
transmitting the feedback data for the control channel separately or jointly with reporting second feedback data for a data channel.

30. The method of claim 29, wherein the feedback data for the control channel is reported jointly with reporting of second feedback data for the data channel based at least in part on reporting of the feedback data for the control channel colliding with reporting of the second feedback data for the data channel.

31. The method of claim 29, wherein the feedback data for the control channel is reported separately from reporting of second feedback data for the data channel based at least in part on reporting of the feedback data for the control channel not colliding with reporting of the second feedback data for the data channel.

32. The method of claim 29, further comprising:
receiving a configuration signaling indicating whether to separately or jointly report the feedback data for the control channel and second feedback data for the data channel.

33. An apparatus for wireless communication, comprising:
a processor;
memory in electronic communication with the processor; and
instructions stored in the memory and operable, when executed by the processor, to cause the apparatus to:
measure channel quality of a reference signal communicated via a control channel;
determine a code rate for the control channel based at least in part on the measured reference signal and a transmission index indicating retransmission;
generate feedback data for the control channel that indicates the code rate;
transmit the feedback data for the control channel to a base station; and
receiving, via the control channel, a control transmission that includes control information encoded using the code rate.

34. The apparatus of claim 33, wherein the instructions are further executable by the processor to:
determine at least one of a channel quality indicator (CQI), a pre-coding matrix indicator (PMI), a precoding type indicator (PTI), or a rank indicator (RI), or a combination thereof, wherein the feedback data for the control channel comprises at least one of the CQI, the PMI, the PTI, or the RI, or a combination thereof.

35. The apparatus of claim 33, wherein the instructions are further executable by the processor to:
identify a payload size of a control information transmission and a metric of the control channel; and
determine a reliability parameter for the control channel, wherein determining the code rate for the control channel is based at least in part on the identified payload size, the metric of the control channel, and the determined reliability parameter.

36. The apparatus of claim 35, wherein the instructions are further executable by the processor to:
select a modulation scheme associated with the control information transmission, wherein determining the code rate for the control channel is based at least in part on the modulation scheme.

37. The apparatus of claim 35, wherein the instructions are further executable by the processor to:
identify an index from a set of indexes in a code rate index table for the control information transmission corresponding to the determined code rate, wherein the feedback data comprises the identified index.

38. The apparatus of claim 35, wherein the instructions are further executable by the processor to:
determine an aggregation level (AL) based at least in part on the identified payload size, the determined code rate, and the determined reliability parameter,
wherein generating the feedback data is based at least in part on the determined AL.

39. The apparatus of claim 38, wherein the feedback data comprises at least one bit to indicate the determined AL.

40. The apparatus of claim 33, wherein determining the code rate for the control channel is based at least in part on a modulation scheme.

41. The apparatus of claim 40, wherein the modulation scheme comprises at least one of quadrature phase shift keying (QPSK) or quadrature amplitude modulation (QAM).

42. The apparatus of claim 33, wherein determining the code rate for the control channel is based at least in part on a number of layers and a transmission mode for control information transmission.

43. The apparatus of claim 42, wherein the transmission mode is one of a common reference signal (CRS)-based transmission mode or a demodulation reference signal (DMRS)-based transmission mode.

44. The apparatus of claim 33, wherein a periodicity for transmitting the reference signal is based at least in part on a duration of a mini-slot or a shortened transmission time interval (sTTI).

45. The apparatus of claim 33, wherein the instructions are further executable by the processor to:
determine a payload size for each of a plurality of downlink control information (DCI) formats; and
determine a plurality of code rates for the control channel based at least in part on the determined payload sizes.

46. The apparatus of claim 45, wherein the feedback data comprises a mapping of each of the determined code rates to a respective payload size of a plurality of different payload sizes.

47. The apparatus of claim 45, wherein the instructions are further executable by the processor to:
determine a plurality of aggregation levels based at least in part on the plurality of code rates, wherein each of the plurality of aggregation levels corresponds to a payload size of a plurality of different payload sizes.

48. The apparatus of claim 47, wherein the feedback data comprises a mapping of each of the determined aggregation levels to a respective payload size of the plurality of different payload sizes.

49. The apparatus of claim 33, wherein the instructions are further executable by the processor to:
receive, from a base station, configuration information instructing the apparatus to perform a measurement on a number of subbands associated with one or more component carriers.

50. The apparatus of claim 49, wherein the instructions are further executable by the processor to:
select to measure on one or more subbands of the number of subbands based at least in part on an apparatus configuration.

51. The apparatus of claim 33, wherein the feedback data comprises channel state information for a subband of the control channel, channel state information for a set of subbands that includes the subband, or wideband channel state information.

52. The apparatus of claim 33, wherein the determining the code rate for the control channel further comprises:
determining a second code rate for the control channel; and
adjusting the second code rate to the code rate based at least in part on the transmission index indicating retransmission.

53. A method for wireless communication at a base station comprising:
transmitting a reference signal in a control channel to a user equipment (UE);

receiving, from the UE, channel quality feedback data for the control channel that indicates a code rate in response to the reference signal and a transmission index indicating retransmission; and transmitting a control channel transmission using a modulation and coding scheme selected based at least in part on the feedback data.

54. The method of claim 53, further comprising:
determining a code rate index from a set of indexes in a code rate index table based at least in part on the feedback data; and
encoding control information based at least in part on a code rate corresponding to the code rate index, wherein the control channel transmission is generated based at least in part on the encoded control information.

55. The method of claim 53, further comprising:
determining an aggregation level from a set of aggregation levels based at least in part on the feedback data; and
encoding control information based at least in part on the determined aggregation level, wherein the control channel transmission is generated based at least in part on the encoded control information.

56. The method of claim 53, further comprising:
determining that the feedback data includes a negative acknowledgment for data transmitted via the control channel, the data encoding using a first code rate;
encoding the data using a second code rate that differs from the first code rate; and
transmitting the data encoded using the second code rate via the control channel.

57. The method of claim 53, further comprising:
selecting a format for control information;
determining a payload size of the selected format;
selecting a code rate for the control information based at least in part on the determined payload size and the feedback data; and
encoding the control information based at least in part on the selected code rate, wherein the control channel transmission is generated based at least in part on the encoded control information.

58. The method of claim 57, further comprising:
determining a number of possible re-transmissions within a latency window based at least in part on the determined payload size, the selected code rate, or both; and
transmitting an indicator of a reporting timeline associated with transmitting the feedback data based at least in part on the determined number of possible re-transmissions.

59. The method of claim 53, wherein the feedback data comprises channel state information for a subband of the control channel, channel state information for a set of subbands that includes the subband, or wideband channel state information.

60. An apparatus for wireless communication, comprising:
a processor;
memory in electronic communication with the processor; and
instructions stored in the memory and operable, when executed by the processor, to cause the apparatus to:
transmit a reference signal in a control channel to a user equipment (UE);
receive, from the UE, channel quality feedback data for the control channel that indicates a code rate in response to the reference signal and a transmission index indicating retransmission; and
transmit a control channel transmission in the control channel using a modulation and coding scheme selected based at least in part on the feedback data.

61. The apparatus of claim 60, wherein the instructions are further executable by the processor to:
determine a code rate index from a set of indexes in a coding table based at least in part on the feedback data; and
encode control information based at least in part on a code rate corresponding to the code rate index, wherein the control channel transmission is generated based at least in part on the encoded control information.

62. The apparatus of claim 60, wherein the instructions are further executable by the processor to:
determine an aggregation level from a set of aggregation levels based at least in part on the feedback data; and
encode control information based at least in part on the determined aggregation level, wherein the control channel transmission is generated based at least in part on the encoded control information.

* * * * *